US006968352B1

(12) United States Patent
Gilloire et al.

(10) Patent No.: US 6,968,352 B1
(45) Date of Patent: *Nov. 22, 2005

(54) DEVICE FOR DIGITAL PROCESSING WITH FREQUENCY FILTERING AND REDUCED COMPUTATION COMPLEXITY

(75) Inventors: André Gilloire, Lannion (FR); Wolfgang Tager, Munich (DE); Valérie Turbin, Rospez (FR)

(73) Assignee: France Telecom, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/762,388

(22) PCT Filed: Aug. 5, 1999

(86) PCT No.: PCT/FR99/01941

§ 371 (c)(1),
(2), (4) Date: Mar. 19, 2001

(87) PCT Pub. No.: WO00/08836

PCT Pub. Date: Feb. 17, 2000

(30) Foreign Application Priority Data

Aug. 6, 1998 (FR) .................................. 98 10124

(51) Int. Cl.$^7$ ............................................. G06F 17/10

(52) U.S. Cl. ...................................... 708/300; 708/315

(58) Field of Search ................................ 708/300, 301, 708/303, 313, 319, 315, 420, 421

(56) References Cited

U.S. PATENT DOCUMENTS

| 4,807,173 A | 2/1989 | Sommen et al. |
| 5,526,426 A | 6/1996 | McLaughlin |
| 5,768,165 A | 6/1998 | Palicot et al. |

FOREIGN PATENT DOCUMENTS

EP 0454242 A1 10/1991

OTHER PUBLICATIONS

Tapio Saramaki: "A Class of Window Functions With Nearly Minimum Sidelobe Energy for Designing Fir Filters" Proceedings of the International Symposium on Circuits and Systems, Portland, May 8-11, 1989, vol. 1, No. SYMP. 22, May 8, 1989, pp. 359-362.
Filter Design Procedures for FIR Decimators and Interpolators, 2 pages, Crochiere R.E., Rabiner L.R.: "Multirate Digital Signal Processing", 1983, Prentice-Hall, US, Englewood Cliffs XP002099771.
Signals and Spectra, 5 pages, Carlson A. Bruce: "Communication Systems" 1986, McGraw-Hill XP002099770.
Ann, Telecommun., 49, n 7-8, 1994, pp. 1/15-15/15, Frequency-domain adaptive filtering with applications to acoustic echo cancellation.

(Continued)

*Primary Examiner*—Chuong D Ngo

(57) ABSTRACT

A device for processing digital data. A module (M2, M3) produces on a data vector of the frequency domain Z(k), wherein K varies from 0 to N−1, a convolution with a function U, convolution which corresponds to a cancellation in the time domain of the samples of the inverse transform of Z(k). The function U is in the form: $U(k)=\sin c(k-k_0/2.e)-j\pi(\alpha(k-k_0/2¿.P(k))$, wherein $K_0$ is a constant integer and P(k) a weighting window symmetrical about $k_0$.

25 Claims, 9 Drawing Sheets

OTHER PUBLICATIONS

IEEE Transactions on Acoustics, Speech, and Signal Processing, vol. ASSP-30, No. 5, Oct. 1982, 5 pages.

IEEETransactions o Acoustics, Speech, and Signal Processing, vol. ASSP-31, No. 5, Oct. 1983, 11 pages.

Comparison of Three Post-Filtering Algorithms for Residual Acoustic Echo Reduction, Valerie Turbin, et al, pp. 307-310.

Digutal Signal Processing, Alan V. Oppenheim, et al, 4 pages, Prentice Hall, 1975.

Ann, Telecommun., 49 n 7-8, 1994, The hands-free telephone problem; an annotated bibliography update.

DEVICE FOR DIGITAL PROCESSING WITH FREQUENCY FILTERING AND REDUCED COMPUTATION COMPLEXITY

BACKGROUND OF THE INVENTION

1. Field of the Invention

The invention relates to digital filters performing processing on a frequency domain function that corresponds to zeroing a portion of a time domain signal obtained by the inverse transform of such a frequency domain function.

Such a frequency domain function can be frequency response, i.e. the transfer function of a filter, e.g. an adaptive filter, or it can be the Fourier transform of a time domain signal.

2. Description of Related Art

In conventional manner, a digital filter performs operations on data that can either be data that is directly available at an input or an output of the filter, or else data that is obtained by applying a transform such as the Fourier transform, the Hartley transform, or some other transform.

Use of such transforms, frequently implemented by means of fast algorithms, serves to reduce very considerably the number of arithmetical operations that need to be performed to process the data.

Digital processing apparatus is often designed to perform convolution or correlation operations. Numerous applications based on adaptive processing of the signal thus require convolution (filtering) and correlation operations to be performed, which operations are performed on vectors having data or coefficients that are variable, said vectors often being large in size (several hundreds to several thousands of coefficients).

In the field of telecommunications, acoustic and electrical echo cancelling, removing noise from speech, and transmission channel equalization, and in other fields, applications such as adaptive control, all make use of such techniques for adaptively processing a signal.

Calculating a convolution or a correlation exactly often requires a constraint to be applied on the size of the time domain vector representing the filter or the data, i.e. a limit on the number of non-zero samples in the inverse transform of the frequency domain vector that is to be used, regardless of whether this frequency domain vector is the frequency response of a filter or the transform of a time domain signal that is to be processed.

This constraint is conventionally implemented by applying an inverse transform on the data in the transform domain, i.e. the frequency domain, and then applying windowing that eliminates certain components of the time domain vector, and finally applying the forward transform so as to obtain the exact result in the transform domain.

When it is desired to make an optimum filter for application to a signal that is subject to disturbance, for example noise or echo, it is common practice to calculate the transfer function of the optimum filter from the affected signal, using some number of frequency domain points in the transform of the signal that is smaller than the total number of points of the signal.

In addition, since the frequency domain vector of the filter is short, exact computation of the output signal of the filter which needs to be performed by linear convolution often assumes that the impulse response of the optimum filter is extended by zeros.

That operation of computing a long frequency response filter on the basis of a short frequency response filter by extending the impulse response of the filter with zeros is usually performed, yet again, by an intermediate passage through the time domain, extending the impulse response of the filter with zeros, and a forward transform so as to obtain the exact result in the transform domain.

It will be understood that passing into the time domain in this way in order to apply constraint zeros, or indeed to extend the impulse response of an optimum filter by means of zeros, is expensive in terms of computation since it requires two transforms to be performed (a forward transform and an inverse transform).

The theoretical bases showing the typical reasons why such constraints are often necessary are described below:

The advantage of using a Fourier transform (FT) for filtering or for computing correlation stems from the fact that in the transform domain convolution and correlation operations are represented merely by multiplications. The description below relates solely to convolution, but correlation is entirely analogous thereto.

Let $h(n)$ be a filter of length $L_h$, and $x(n)$ an input signal to the filter. The output of the filter is then written:

$$y(n) = x(n) * h(n) = \sum_{i=0}^{L_h-1} h(i)x(n-i) = IFT[FT[x(n)] \cdot FT[h(n)]]$$

where $FT[\ldots]$ and $IFT[\ldots]$ designate the forward Fourier transform and the inverse Fourier transform, and where $*$ designates the convolution operation. In practice, two difficulties prevent the above equation being used directly:

- in order to calculate the Fourier transform of the signal, it is necessary to know the signal in full, i.e. all past and future samples, and that is not possible; and
- in numerous applications such as echo cancelling or adaptive filtering, the filter $h(n)$ varies in time.

To resolve those problems, the person skilled in the art subdivides the signal into blocks of length $N$ and associates each block $b$ with a filter $h_b(n)$ of length $L_h$. In the general case, such blocks overlap. In order to simplify notation, it is assumed that the blocks are juxtaposed, but this condition is not necessary.

Let:

$$x_b(n) = \begin{cases} x(n+bN) & \text{if } 0 \le n \le N-1 \\ 0 & \text{elsewhere} \end{cases}$$

The output signal $y(n)$ is given by:

$$y(n) = \sum_{b=-\infty}^{\infty} y_b(n-bN) \text{ with } y_b(n) = x_b(n) * h_b(n)$$

In order to calculate the forward and inverse Fourier transforms, a fast method is used known as the "fast Fourier transform" ($FFT_T$ for a forward transform on T points, $IFFT_T$ for the inverse transform on T points).

The signal $y_b(n)$ is zero for $n<0$ and $n \ge T = N + L_h - 1$, which means that the minimum number of points for calculating the transforms is equal to $T$. It can be proved that for $0 \le n \le T-1$, the following is obtained:

$$y_b(n) = IFFT_T[FFT_T[x_b(n)] \cdot FFT_T[h_b(n)]] = IFFT_T[X_{b,T}(k) \cdot H_{b,T}(k)]$$

In some cases, there is no need for all of the values of $y_b$, but only for $L_y$ consecutive points. In which case, the size of the FFTs must satisfy:

$$T \geq 0.5*(N+L_h+L_y-1)$$

This constraint is known as the linear convolution constraint.

In practice, the following problem is often encountered:

N (the size of a data block), T (the size of the FFT), and $L_y$ (the working length of the result) are set. X(k) is computed by the FFT and the filter H(k) by some arbitrary method directly in the transform domain on T points. The two factors for multiplication are thus available, but the condition that is necessary to ensure that filtering is correct:

$$L_h \leq 2T-N-L_y+1$$

is not satisfied. The question is how to obtain a filter $\tilde{H}(k)$ in the transform domain which is an approximation to $H_{b,T}(k)$, but which also satisfies the constraint. In the prior art, the inverse transform of H is computed, a portion of the signal is set to zero, and a forward transform of said extended function is recomputed in order to replace H.

Another problem is also very frequently encountered. It is as follows:

N (the size of a data block), T (the size of the FFT), and $L_y$ (the useful length of the result) are set. X(k) is calculated by the FFT and the filter H(k) by some arbitrary method directly in the transform domain on $L=T/D \leq 2T-N-L_y+1$ points. The question is how to obtain a filter $\tilde{H}(k)$ in the transform domain on T points instead of L which is an interpolation of H(k) and which satisfies the constraint $L_h \leq 2T-N-L_y+1$.

In the prior art, the inverse transform of H is computed, it is extended with zeros, a new function H is recomputed on the basis of the truncated inverse transform, and then by means of a forward transform.

When there is a zero constraint, proposals have been made to avoid passing in this way via two successive transforms which are expensive in computation by means of processing (filtering) performed directly in the transform domain on the frequency domain data.

When cancelling an acoustic echo, and more precisely in the field of block adaptive filters using the Fourier transform, frequently known as frequency domain adaptive filters (FDAF), Clark et al. [1] describe a general formalism from which it can be seen that it is necessary to apply a constraint on the length of the impulse response of the adaptive filter in order to obtain an exact algorithm, and they propose implementing convolution with the frequency response of the filter that is equivalent to multiplying by a window in the time domain. The number of coefficients in the proposed convolution is very high, thus maintaining very complex computation.

Sommen et al. [5] describe another variant of FDAF in which the time constraint is implemented by convolution in the frequency domain: the authors propose applying smoothing to the frequency data representing the response of the filter, and in particular smoothing over three coefficients which is equivalent to weighting the time response by a cosine window.

The maximum of the window is assumed to correspond to the dominant coefficients of the response, which assumption is highly restrictive. The justification given by those authors for their method lies in reducing adaptation noise associated with coefficient weighting, rather than seeking an approximation to the exact solution for applying a constraint.

Other references are also mentioned, Mansour et al. [2] proposing a simplified FDAF without applying a constraint, giving rise to a considerable reduction in complexity but also to performance that is less good than that of algorithms having constraints.

Prado et al. [3] also describe a generalized version of FDAF that they refer to generalized multi-delay filter with an oversampling factor of α (GMDFα), which makes it possible to process long impulse responses with shorter data blocks by segmenting the impulse response into short blocks, thereby reducing the processing delay in the algorithm. That algorithm uses the above-mentioned constraint.

McLaughlin et al. [4] describe a modified form of the FDAF algorithm that reproduces certain aspects of GMDF, in particular segmentation of the impulse response into short blocks, and they propose a technique of applying the constraint on the various blocks that varies over time in application of a well-defined scheme (implemented by a "scheduler"), which enables complexity to be limited while preserving the benefit of the constraint to some extent.

BRIEF SUMMARY OF THE INVENTION

The main object of the invention is to propose a digital filter acting on a frequency domain vector to perform convolution that is equivalent to windowing a time domain signal corresponding to said frequency domain vector, and that produces sufficient computation accuracy while requiring only a particularly small amount of computation.

The invention achieves this object by digital data processing apparatus comprising a module implementing convolution with a function U on a frequency domain data vector Z(k) where k lies in the range 0 to N-1, which convolution corresponds to zeroing samples in the time domain of the inverse transform of Z(k), the apparatus being characterized in that the function U has the form:

$$U(k) = \mathrm{sinc}\left(\frac{k-k_0}{2}\right) \cdot e^{-j\pi\left(\frac{\alpha(k-k_0)}{2}\right)} \cdot P(k)$$

where $k_0$ is a constant integer and P(k) is a weighting window that is symmetrical about $k_0$.

Such a filter has a number of coefficients that can be adjusted depending on the degree of approximation desired in the result, which number can be very small. In order to be implemented, such a filter requires a number of arithmetic operations that is considerably smaller than that required in conventional solutions.

BRIEF DESCRIPTION OF THE DRAWINGS

Other characteristics, objects, and advantages of the invention will appear on reading the following description made with reference to the accompanying figures, in which.

DETAILED DESCRIPTION OF THE INVENTION

First sound filter apparatus in accordance with the invention is described below with reference to FIG. 17.

This apparatus receives a discrete time domain signal at its input that is constituted by a plurality of blocks each consisting of 1024 samples in the non-limiting example described herein. This time domain signal is a sound or acoustic signal, for example representative of the speech of a user speaking into a microphone.

Figure 20:
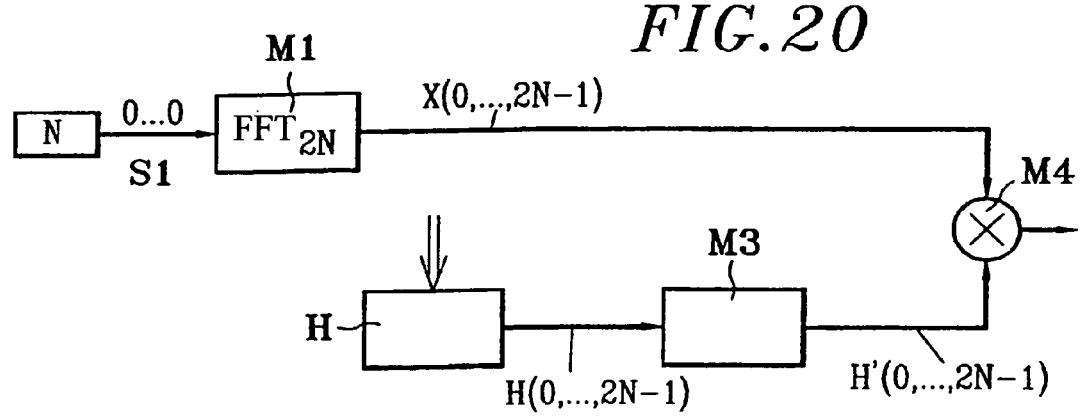

In FIG. 20, one of the time domain blocks is referenced $S1(0, \ldots, N-1)$, where N is equal to 1024.

This signal S1 is received by a first module M1 which performs a fast Fourier transform of order N on said signal, written $FFT_N$, so as to provide a frequency domain signal having N samples $X(0, \ldots, N-1)$. This frequency domain signal is thus likewise a signal representative of a sound. Thus, in this case, this signal is an acoustic signal.

Starting from this frequency domain vector X of size N, an adaptive filter H calculates a vector $H(0, \ldots, N-1)$, in which the N coefficients depend on the vector X. Each component of the vector H is calculated by an algorithm that uses components of the vector X. This dependence is shown in FIG. 17 by a double-shafted arrow.

In conventional manner, such an adaptive filter H is for applying to the signal X from which it adapts itself, e.g. so as to cancel an echo detected in the signal X.

Nevertheless, the N-coefficient filter H cannot be applied directly to X as obtained at the output from H. As explained above, the vector H must be processed so that its impulse response presents some non-zero number of coefficients that is less than a value N' that is less than N. In other words, the vector H must satisfy a linear convolution constraint before being convoluted with the vector X.

To obtain a vector H' from the vector H and satisfying such a constraint, it is known to place a set of three modules at the output from the adaptive filter H: one module that performs an inverse transform of H into the time domain; a second module that multiplies the impulse response of the filter H by a rectangular window that keeps a portion of the impulse response unchanged and that replaces the tail portion of said response impulse with zeros; and a third module that performs a forward transform so as to obtain the frequency response of the filter H' corresponding to the truncated impulse response.

Figure 17:
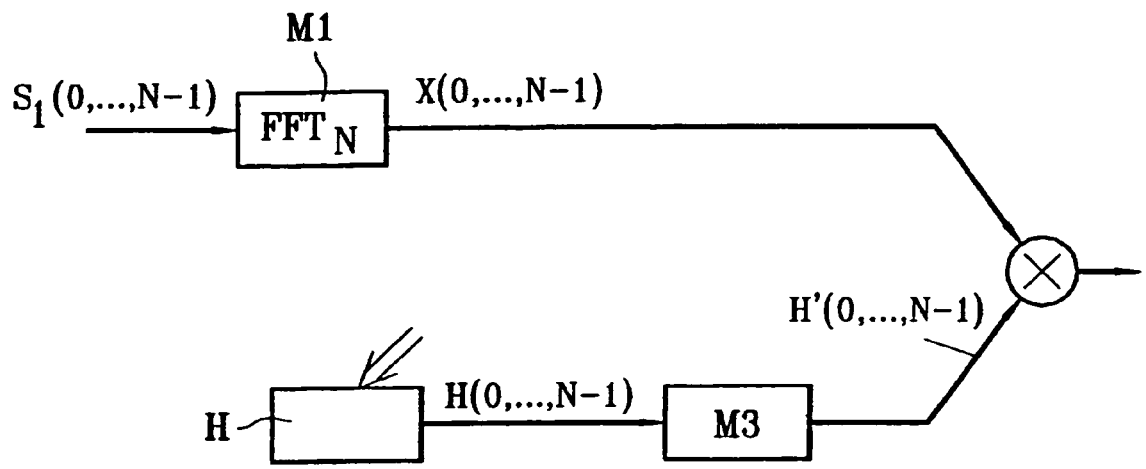
FIGS. 17 to 21 show five variant adaptive filter apparatuses of the invention.

Between the output from the adaptive filter H and a module for convolution with the signal X, the apparatus of FIG. 17 presents a module M3 that performs processing in the frequency domain on the frequency domain vector $H(0, \ldots, N-1)$ without passing via the time domain, for the purpose of providing a frequency domain vector H' having N coefficients with an impulse response having non-zero values for its N' first coefficients only, said N' first coefficients being the same as the N' first coefficients of the impulse response of H.

To perform such processing, the modulo M3 performs convolution of $H(0, \ldots, N-1)$ with a function $U(k)$ that is given by:

$$U(k) = \frac{1}{2}\mathrm{sinc}\left(-\frac{Lu-1}{4} + \frac{k}{2}\right) \cdot \mathrm{kaiser}(k, \beta) \cdot e^{-j\pi\left(-\frac{Lu-1}{4} + \frac{k}{2}\right)}$$

where k lies in the range 0 to Lu−1, and $U(k)$ is zero for values of k lying outside the range 0 to Lu−1. The sinc function in the above formula is given by:

$$\mathrm{sinc}(x) = \frac{\sin(\pi \cdot x)}{\pi \cdot x}$$

The sinc function takes the value 1 when x=0.

In the particular example described herein Lu is set to 7, such that Lu−1 is even, and such that (Lu−1)/4 is a multiple of ½.

The function $U(k)$ can also be written:

$$U(k) = \frac{1}{2} \cdot \mathrm{sinc}\left(\frac{k-k_0}{2}\right) \cdot e^{-j\pi\left(\frac{k-k_0}{2}\right)} \cdot \mathrm{Kaiser}(k, \beta).$$

Such a function $U(k)$ has a substantially rectangular window for its time domain transform, having a value of about 1 while k lies in the range 0 to 512, and 0 for k lying in the range 512 to 1024.

The inventors have come to a function having this form by observing that the function $$\mathrm{sinc}\left(\frac{k}{2}\right)$$

has, as its inverse discrete transform in the time domain, a function whose value is substantially constant and close to 2 for k lying in the range 0 to N/4 and also for k lying in the range 3N/4 to N, while it takes values that are close to zero for k lying in the range N/4 to 3N/4.

To obtain a frequency function U(k) corresponding to a time window that takes substantially the value 1 for k=0, . . . ,N/2 and the value 0 for k=N/2, . . . ,N−1, the inventors have used the property whereby multiplication in the frequency domain by a complex exponential $$e^{j2\pi \frac{k n_0}{N}},$$

is equivalent to shifting the corresponding time domain function as obtained by the inverse Fourier transform through $n_0$.

In the present case, the inventors have used the value $n_0/N=¼$, producing a circular shift of one-fourth of the window of the inverse discrete transform of the function $$\operatorname{sinc}\left(\frac{k}{2}\right),$$

thus making it possible to obtain the desired window. This window thus corresponds to a second half of the time domain signal being set to zero, and to the first half of the time domain signal being kept unchanged. More generally, it is possible to use a shift other than that proposed herein that applies to one-fourth of the window. In which case, use is made of the following function:

$$U(k) = \operatorname{sinc}\left(\frac{k-k_0}{2}\right) \cdot e^{-j\pi\left(\frac{\alpha(k-k_0)}{2}\right)} \cdot \operatorname{Kaiser}(k, \beta)$$

where α is a constant selected to obtain the desired offset. Thus, α having a value equal to 2 corresponds to a time domain window which is zero over the first- and fourth-fourths of the time domain medium, and equal to 1 over a central portion of the medium, having a length equal to half that of the medium. The invention is therefore not limited to α having a value equal to 1 as described in the present particular embodiments. Another preferred embodiment of the invention has α=−1, which corresponds to zero in the first portion of the window. The person skilled in the art will adjust the value of α depending on which portion is to be set to zero, given the offset which is performed in circular manner.

In this formula, the function U is multiplied by a conventional weighting window, in this case the kaiser window with β=1.5.

The conventional function of the weighting window is to reduce an error amplitude peak in the transform window of a truncated signal, in this case the following signal:

$$U(k) = \operatorname{sinc}\left(\frac{k-k_0}{2}\right) \cdot e^{-j\pi\left(\frac{\alpha(k-k_0)}{2}\right)}$$

truncated over the range $0 \leq k \leq (Lu-1)$.

Preferably, the weighting window is a window that is symmetrical about a value $k_0$ for k in which the function:

$$U(k) = \operatorname{sinc}\left(\frac{k-k_0}{2}\right) \cdot e^{-j\pi\left(\frac{\alpha(k-k_0)}{2}\right)}$$

presents its maximum for its modulus (in absolute value). In this way, the coefficients of the product of:

$$U(k) = \operatorname{sinc}\left(\frac{k-k_0}{2}\right) \cdot e^{-j\pi\left(\frac{\alpha(k-k_0)}{2}\right)}$$

multiplied by said weighting window has the same properties as the coefficients of:

$$U(k) = \operatorname{sinc}\left(\frac{k-k_0}{2}\right) \cdot e^{-j\pi\left(\frac{\alpha(k-k_0)}{2}\right)}$$

as described below, thereby providing significant advantages in terms of the amount of computation and memory size.

The person skilled in the art can thus replace the kaiser window as proposed herein by any other known weighting window, for example a Hanning window.

In the present embodiment, where Lu=7, the following values of U are obtained for different values of k:

|  | k | | | | | | |
| --- | --- | --- | --- | --- | --- | --- | --- |
|  | 0 | 1 | 2 | 3 | 4 | 5 | 6 |
| U(k) | 0.0644 j | 0 | 0.3027 j | .5 | −0.3027 j | 0 | −0.0644 j |

It can be seen that the filter presents hermitian symmetry about the value $k_0$ of k for which:

$$-\frac{Lu-1}{4} + \frac{k_0}{2} = 0 \text{ i.e. } k_0 = \frac{Lu-1}{2}, \text{ i.e. } k_0 = 3.$$

Because of this hermitian symmetry itself, only half of the coefficients of the filter U need to be calculated. In addition, because of this hermitian symmetry, convolution with U can be performed with the amount of computation required being reduced to close to 50%, as demonstrated below.

It can also be observed that the coefficients of the filter alternate between being pure reals and pure imaginaries. This property comes from the fact that the argument of the factor:

$$e^{-j\pi\left(\frac{k}{2} - \frac{Lu-1}{4}\right)}$$

is a linear function varying stepwise at a pitch of $$-j\frac{\pi}{2}$$

and when k=0 has a value which is a multiple of $$j\frac{\pi}{2}.$$

This property comes from the fact that the filter is a half-band filter. Nevertheless, hermitian symmetry can also be obtained with a filter that is other than half-band, for example a filter corresponding to a window in which one-fourth of the time domain signal is set to zero.

It can also be seen that every other coefficient of the filter U is zero, apart from the coefficient where k=3. The function sinc(x) is zero for all integer x other than zero. This property also stems from the fact that U is a half-band filter. Thus, for the coefficients given above, one coefficient in seven is zero.

These three properties thus make it possible to achieve a major reduction in the amount of computation required.

When U(k) is convoluted with H(k) by the module M3, a vector H' is provided that is expressed in the following form:

$$H'(k+3)=H(k).U(6)+H(k+1).U(5)+H(k+2).U(4)+H(k+3).U(3)+H(k+4).U(2)+H(k+5).U(1)+H(k+6).U(0)$$

A coefficient of index k' is thus calculated for H' by convoluting U and H in such a manner that the coefficient of H having the same index k' is multiplied by the value of U having the maximum modulus. The other multiplications of this convolution are performed by increasing the index of U when the index of H decreases, as with all convolutions.

In other words, the function H' is equal to the convolution of H with a function of the form:

$$U(k)=\frac{1}{2}\cdot\text{sinc}\left(\frac{k-k_0}{2}\right)\cdot e^{-j\pi\left(\frac{k-k_0}{2}\right)}$$

where $k_0$ is zero.

More generally, it is possible to use a function U having the form:

$$U(k)=\frac{1}{2}\text{sinc}\left(B+\frac{1}{2}+\frac{k}{2}\right)\cdot e^{-j\pi\left(B+\frac{1}{2}+\frac{k}{2}\right)}\cdot P(k)$$

where the constant B is an integer selected in arbitrary manner and where P is a weighting window.

The constant B offsets the function U(k) and that is easily taken into account by the person skilled in the art when computing the convolution, given the fact that to obtain the coefficient of given index k' of H', the convolution must be such that the coefficient of H having the same index k' must be multiplied by the maximum modulus coefficient of U.

The fact that a function F2 is equal to the convolution of F1 and $U_0$ means that:

$$F2(k)=F1(k).U_0(0)+F1(k-1).U_0(1)+F1(k+1).U_0(-1)+F1(k-2).U_0(2)+F1(k+2).U_0(-2)+\ldots$$

When $U(k)=U_0(k+B)$, the following can be written:

$$F2(k)=F1(k).U(-B)+F1(k-1).U(-B+1)+F1(k+1).U(-B-1)+\ldots$$

And thus:

$$F2(k+B)=F1(k+B).U(-B)+F1(k+B-1).U(-B+1)+F1(k+B+1).U(-B-1)+\ldots$$

Providing the signal obtained by convolution is itself offset in suitable manner, the result of a convolution is unaffected by one of the functions involved in the convolution being itself offset by an integer number of samples.

The module M3 can thus comprise a first unit performing the required multiplications and additions, and a second unit performing the offset.

In the present case, and in accordance with the invention, convolution is performed between the input frequency domain signal H and the function U in such a manner, that in the convolution computation giving H' to the index k, H(k) is multiplied by the value reached by U when sinc(U) has a maximum, i.e. H(k) is multiplied by U(k+A) where A is such that the argument of the cardinal sine function (sinc) is zero.

In this convolution, H(k+1) is thus multiplied by U(k+A−1), H(k−1) is multiplied by U(k+A+1), H(k+2) is multiplied by U(k+A−2), H(k−2) is multiplied by U(k+A+2), and more generally H(k+p) is multiplied by U(k+A−p).

The inventors have found that by performing such a convolution with such a function U, a zero constraint is applied to half of the time domain signal corresponding to H, with very satisfactory accuracy, and this is done while implementing a very small amount of computation, without any need to perform an inverse transform in the time domain.

In the embodiment shown in FIG. 17, for the filter U as described above, the following applies:

$$U(1)=U(5)=0,\ U(0)=-U(6),\ U(1)=-U(5),\ \text{and}\ U(2)=-U(4).$$

Thus:

$$H'(k+3)=U(0).(H(k+6)-H(k))+U(2)(H(k+4)-H(k+2))+U(3)(H(k+3)),$$

i.e.:

$$H'(k+3)=U(0).A(k)+U(2)B(k)+U(3)(H(k+3))$$

with $$A(k)=H(k+6)-H(k)\ \text{and}\ B(k)=H(k+4)-H(k+2).$$

Thus, instead of seven complex multiplications and six complex additions, i.e. 28 real multiplications and 26 real additions, convolution can be performed with six real multiplications and eight real additions.

With apparatus different from that shown in FIG. 17 but having a similar module M3, if the signal H is obtained by transforming a real time domain signal, then H presents hermitian symmetry of which advantage can be taken in like manner, thereby enabling the amount of computation required to be divided by two.

The values of H(k) for k<0 and k>N−1 can be obtained by using modulo N addressing (−1 corresponding to N−1, −2 to N−2, etc. ... ).

Figure 1:
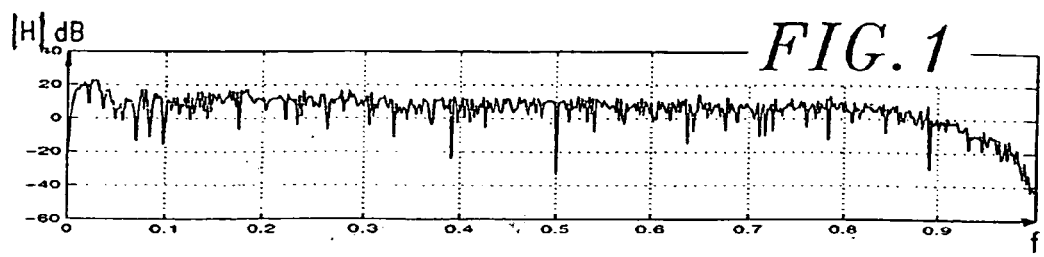
FIGS. 1 to 3 show respectively the modulus of the frequency response, the phase of the frequency response, and the impulse response of a filter.
Figure 2:
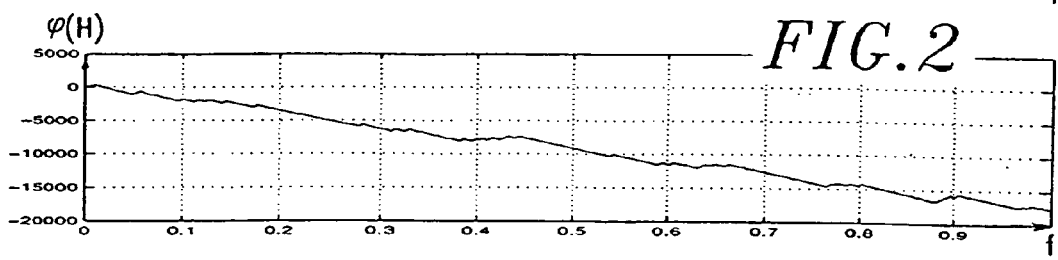
Figure 3:
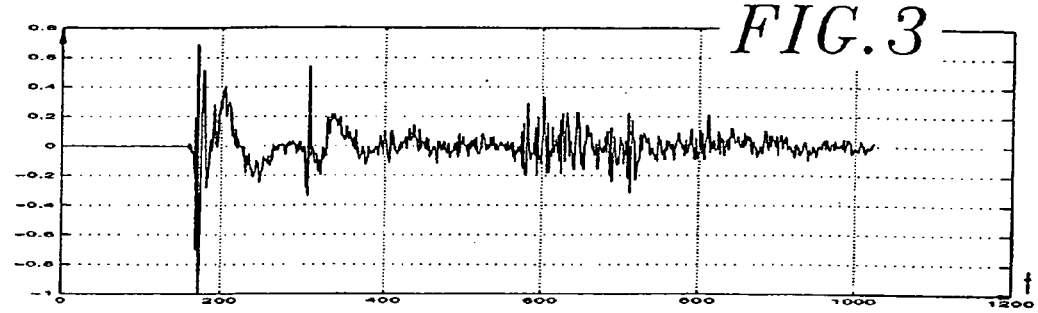

FIGS. 1 and 2 show the signal H(k) in amplitude and in phase over the set of its 1024 points, while FIG. 3 shows the impulse response h(i) over 1024 points, corresponding to H(k).

Figure 7:
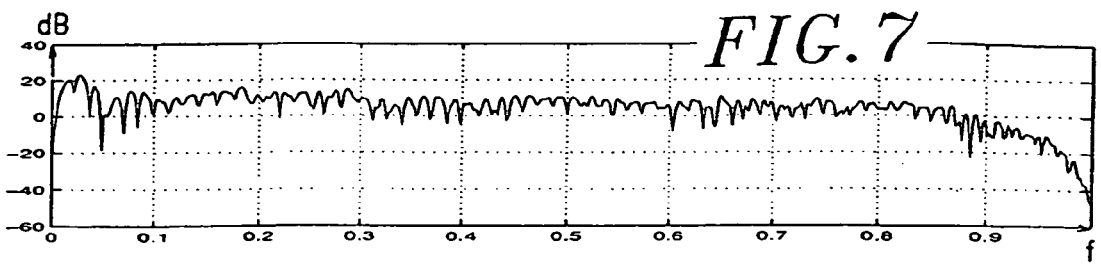
FIGS. 7 to 9 show respectively the modulus of the frequency response, the phase of the frequency response, and the impulse response of the filter of FIGS. 1 to 3 after a zero constraint has been applied to them using the apparatus of the invention.
Figure 8:
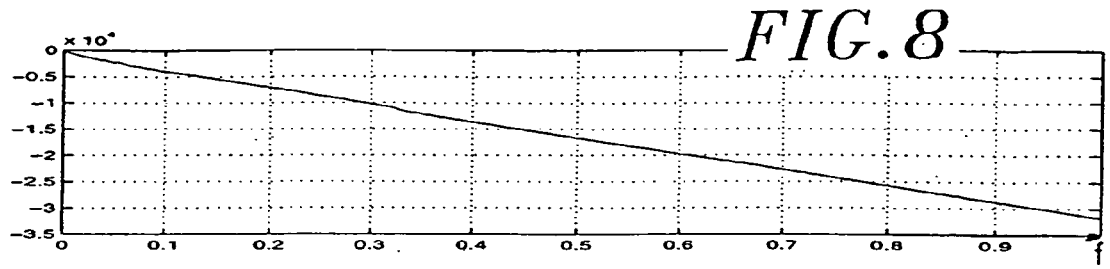
Figure 9:
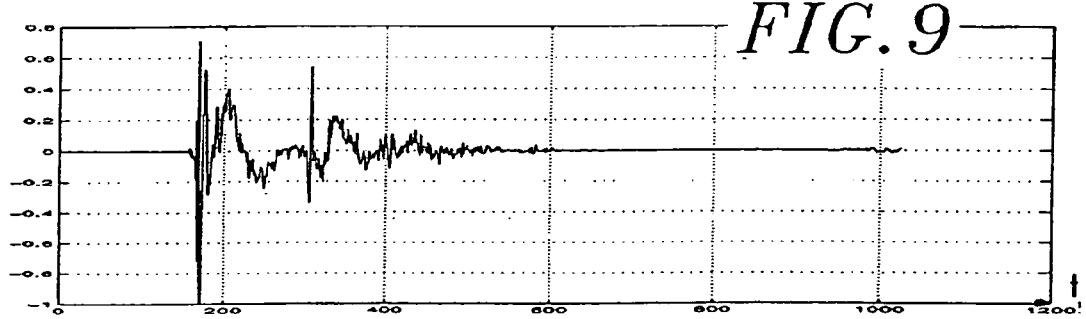

FIGS. 7 and 8 show the frequency domain signal H' obtained after convolution of H and U, respectively in amplitude and in phase. FIG. 9 shows the impulse response h' corresponding to said signal.

It can be seen that the impulse response h' is zero for the last 512 points while it remains unchanged over its first 512 points.

The results obtained with the apparatus of the invention are compared below with the results obtained with conventional apparatus implementing an inverse Fourier transform, setting the second portion of the impulse response to zero, and applying a Fourier transform to said truncated time domain signal.

Figure 4:
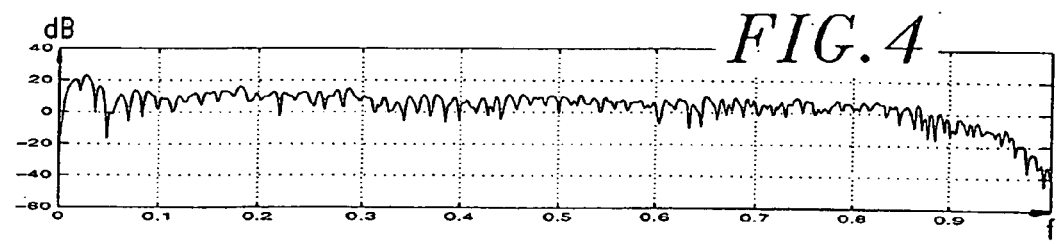
FIGS. 4 to 6 shows respectively the modulus of the frequency response, the phase of the frequency response, and the impulse response of the filter of FIGS. 1 to 3 after the same zero constraint has been applied to them using a conventional two-transform apparatus.
Figure 5:
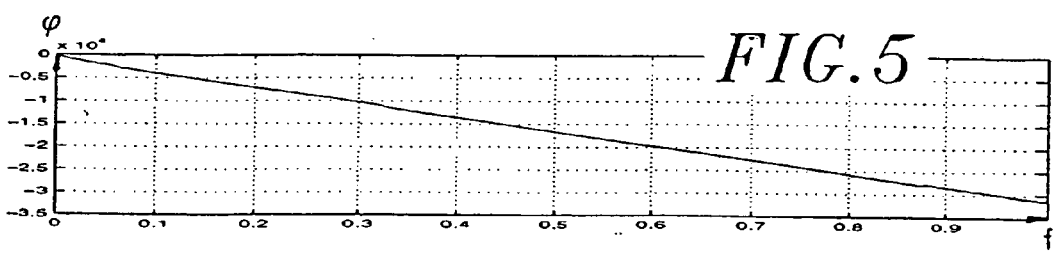
Figure 6:
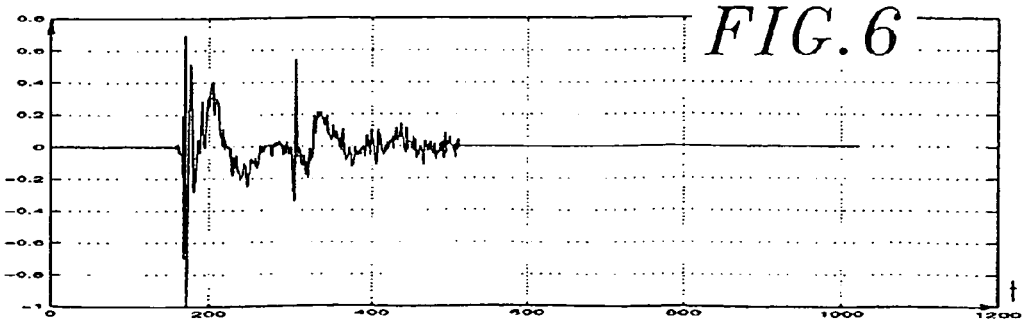

Thus, FIGS. 4 and 5 show the frequency domain signal obtained after the above three conventional processing steps, said signal being shown respectively in amplitude and in phase. FIG. 6 shows the impulse response of the signal.

Figure 10:
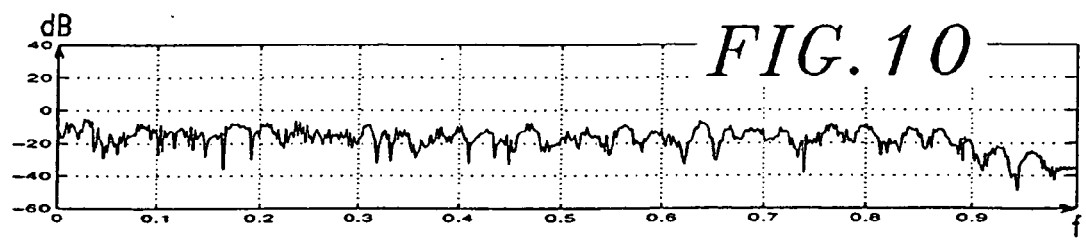
FIGS. 10 to 12 show respectively the frequency modulus, the frequency phase, and the error impulse response obtained with the apparatus of the invention compared with conventional apparatus.
Figure 11:
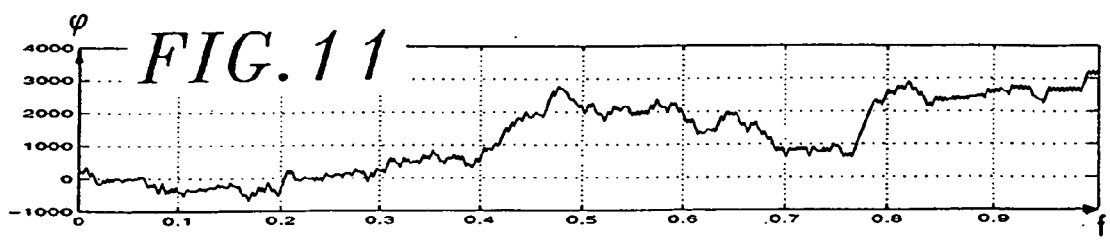

FIGS. 10 and 11 show amplitude and phase error respectively between the frequency domain signals obtained using the conventional apparatus and the frequency domain signals obtained using the apparatus of the invention.

Figure 12:
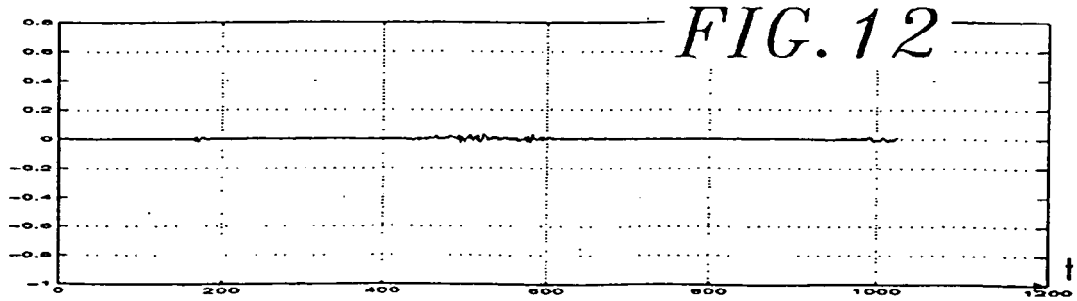

FIG. 12 shows the error in the impulse response.

The person skilled in the art will observe that the resulting error is very small, and compatible with the required level of performance, particularly in speech-processing applications such as acoustic echo cancellation.

A second apparatus of the invention is described below with reference to FIG. 18. This apparatus receives at its input a time domain signal S1 comprising 2N samples, where 2N is equal to 1024. A first module M1 implements a discrete Fourier transform on the 2N points of S1 to supply a frequency domain vector X having 2N points, with indices lying in the range 0 to 2N−1.

A module M5 placed at the output of M1 decimates X(0, ... ,2N−1), so that every other coefficient in X is retained, thereby establishing a frequency domain vector X'(0, ... ,N−1).

An adaptive filter that depends on X is provided at the output of M5 and delivers an N-coefficient vector H(0, ... ,N−1). Since the vector H has only N coefficients, it cannot be convoluted with X(0, ... ,2N−1). It is therefore necessary to construct a vector H'(0, ... ,2N−1) having 2N coefficients that is based on H and that has an inverse transform whose first N samples are identical to those of the impulse response of H, and whose last N samples are zero.

For this purpose, a module M3 is placed between the filter H and a convolution module operating with the function X(0, ... ,2N−1).

At its input, the module M3 receives the frequency domain signal H with N=512 points, corresponding to 512 point impulse response.

Starting from these N=512 frequency points, it is desired to obtain a function H' having 2N points.

The module M3 comprises two modules $M_3'$ and $M_3''$. The first module $M_3'$ inserts a zero after each of the N points of the signal H so as to obtain the signal $H_0(0, ... ,2N-1)$ having 2N=1024 points, where every other coefficient is zero, and more precisely where all of the coefficients of odd index are zero.

The frequency domain vector $H_0$ obtained in this way corresponds to an impulse response having 2N=1024 points in which the first N points are the same as those of the impulse response of H, to within a factor of ½.

The impulse response of H thus remains unchanged by inserting zeros between the initial samples, provided the initial samples are in a signal that has been handed out on every other sample starting from the first index of the completed signal, i.e. starting from index 0 of the completed signal has indices starting from index 0. The samples of H are thus located at the even indices of H'. This insertion does not alter the first portion having 512 points of the impulse response.

A second module $M_3''$ then performs completed frequency domain vector processing $H_0$, which is similar to the processing described above with reference to FIG. 17 and which has the effect of putting the last N points of the 2N point impulse response of $H_0$ to zero without altering the first N points, and doing so in the transform domain without returning to the time domain.

In this case, a filter of length 15 is used whose coefficients are computed in a manner that is analogous to that used in the first embodiment.

In the present case, every other value of the frequency domain signal $H_0$ for convolution is zero. Thus, only one coefficient in two of the filter needs to be multiplied with a non-zero value of $H_0(k)$.

Furthermore, by setting the second portion of the impulse response to zero and retaining its first half unchanged, there is no modification to the initial 512 coefficients of the frequency function between which a zero has been inserted on each occasion as described above.

Thus, the convolution of $H_0$ with a function U such as that suggested above, corresponding to a half-band time window, does not alter the 512 non-zero values of $H_0$, i.e. the values of $H_0(k)$ for which the even values of k lie in the range 0 to 1022.

As a result, only the zero values of $H_0(k)$ need to be recomputed by convolution.

There is therefore no need to compute every other coefficient of the filter U. With a filter U of length 15 and achieving its maximum modulus, i.e. its hermitian symmetry point, for $k_0=7$, i.e. with:

$$\tilde{U}(k) = \text{sinc}\left(-\frac{Lu-1}{4} + \frac{k}{2}\right) \cdot \text{kaiser}(k, \beta) \text{ and}$$

$$U(k) = \tilde{U}(k) e^{-j\pi\left(\frac{Lu-1}{4} + \frac{k}{2}\right)}$$

and for Lu=15, the following coefficients are obtained:

| k | | | | | | | | |
|---|---|---|---|---|---|---|---|---|
| 0 | 2 | 4 | 6 | 7 | 8 | 10 | 12 | 14 |
| U(k)  0.0552 j | 0.1001 j | 0.1952 j | 0.6308 j | 1 | −0.6308 j | −0.1952 j | −0.1001 j | −0.0552 j |

Lu is preferably selected to be odd so as to obtain equal numbers of coefficients on either side the point of symmetry of U.

Since every other coefficient is not useful, the coefficients for computation are all purely imaginary and do indeed present hermitian symmetry about $k_0=7$.

As in the preceding case, computation is advantageously performed as follows:

Writing $$A(k)=Z(k+14)-Z(k)$$

$$B(k)=Z(k+12)-Z(k+2)$$

$$C(k)=Z(k+10)-Z(k+4)$$

$$D(k)=Z(k+8)-Z(k+6)$$

and with $$k_0 = \frac{Lu-1}{2} = 7,$$

the following interpolated result is obtained:

$$H'(k) = \begin{cases} H(k) \text{ if } \underline{k} \text{ is even} \\ U(0)A(k-7)+U(2)B(k-7)+U(4)C(k-7)+U(6)D(k-7) \text{ if } \underline{k} \text{ is odd} \end{cases}$$

Computation thus amounts to eight real multiplications and 14 real additions for each of the calculated points.

Figure 18:
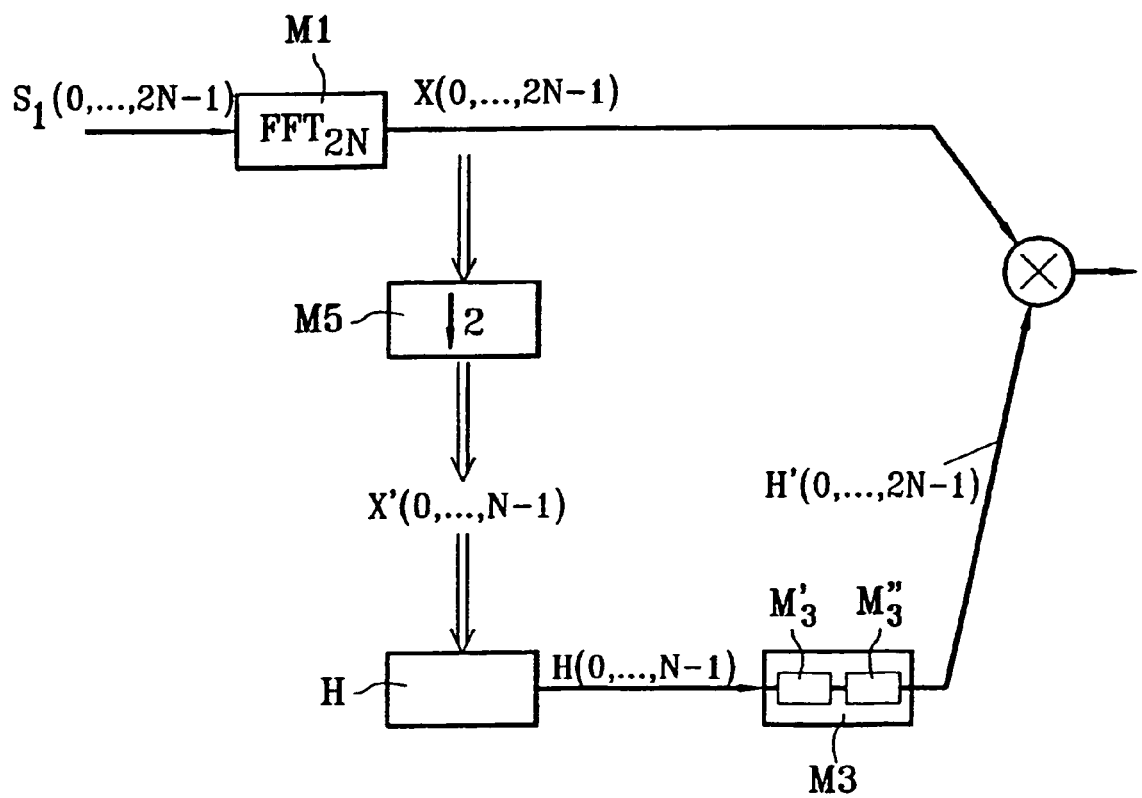

Naturally, in apparatus that differs from that shown in FIG. 18, but that has a similar module M3, the vector H for interpolation can be the transform of the time domain signal and this time domain signal can be real. In which case, the complexity of the computation is further reduced by a factor of 2 by hermitian symmetry of h;

Results corresponding to this example are described below.

Figure 13:
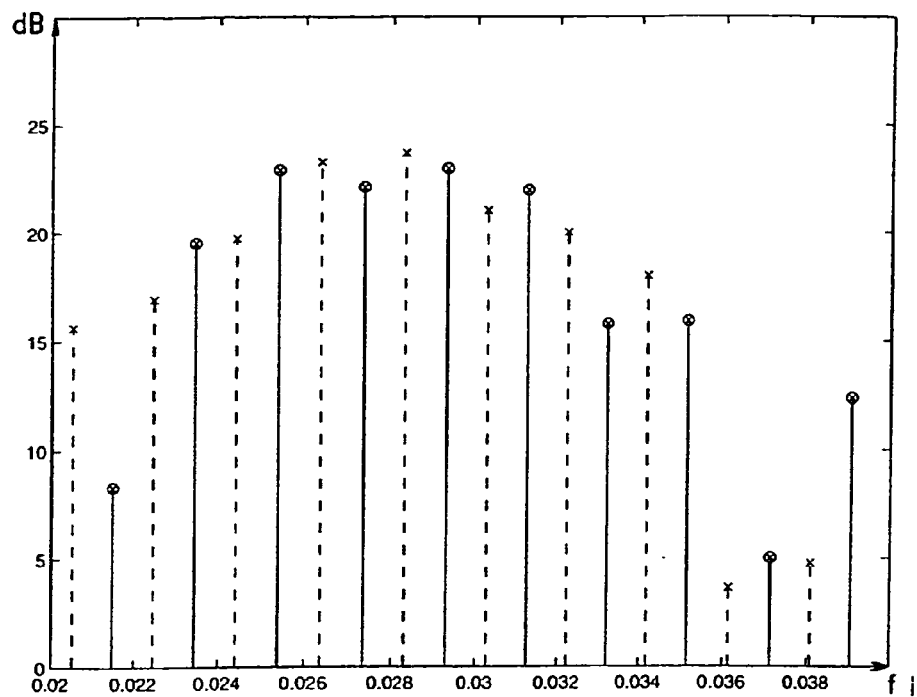
FIG. 13 shows the amplitude of the transfer response of a filter together with a few points interpolated with apparatus of the invention.
Figure 14:
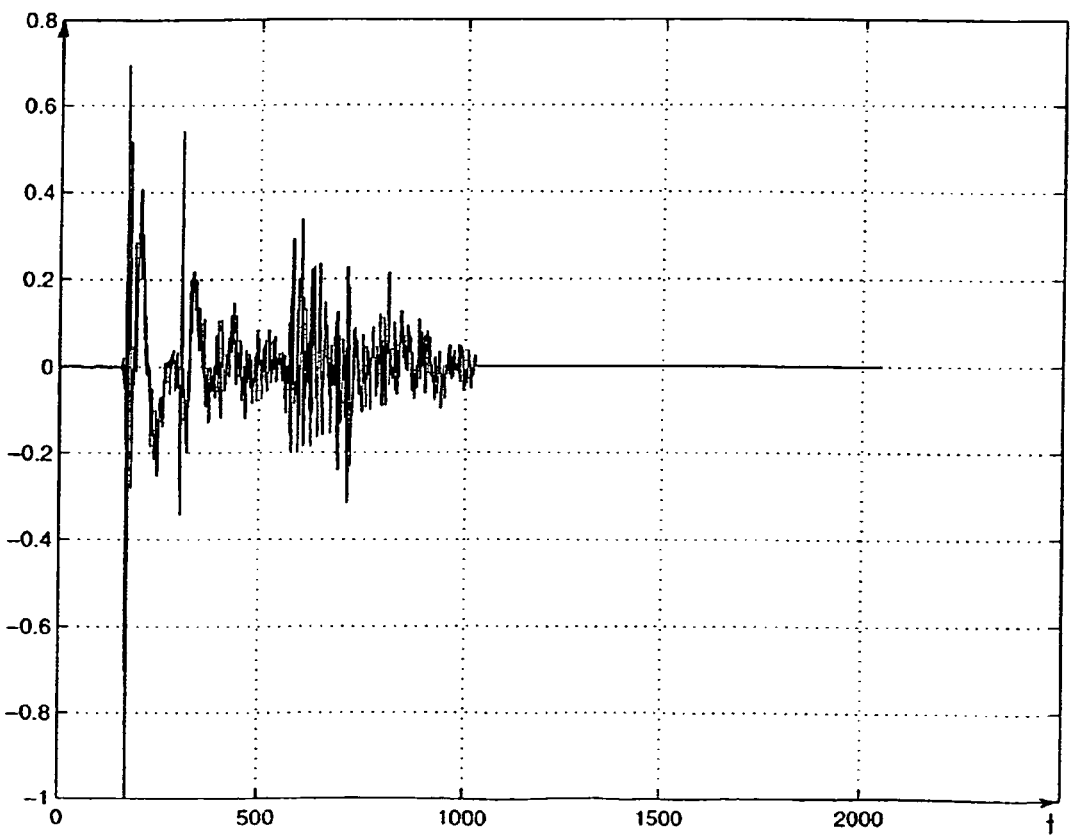
FIG. 14 shows the impulse response of the FIG. 13 filter without interpolation, and extended by zeros.
Figure 15:
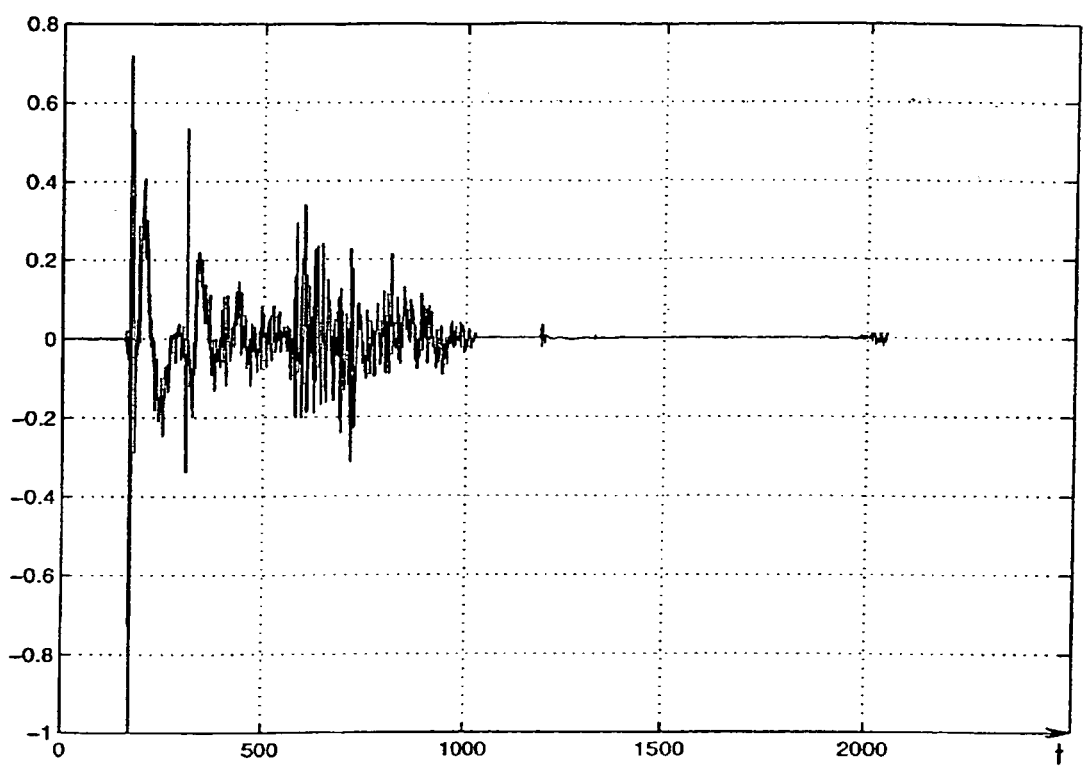
FIG. 15 shows the impulse response of the FIG. 13 filter with interpolation.
Figure 16:
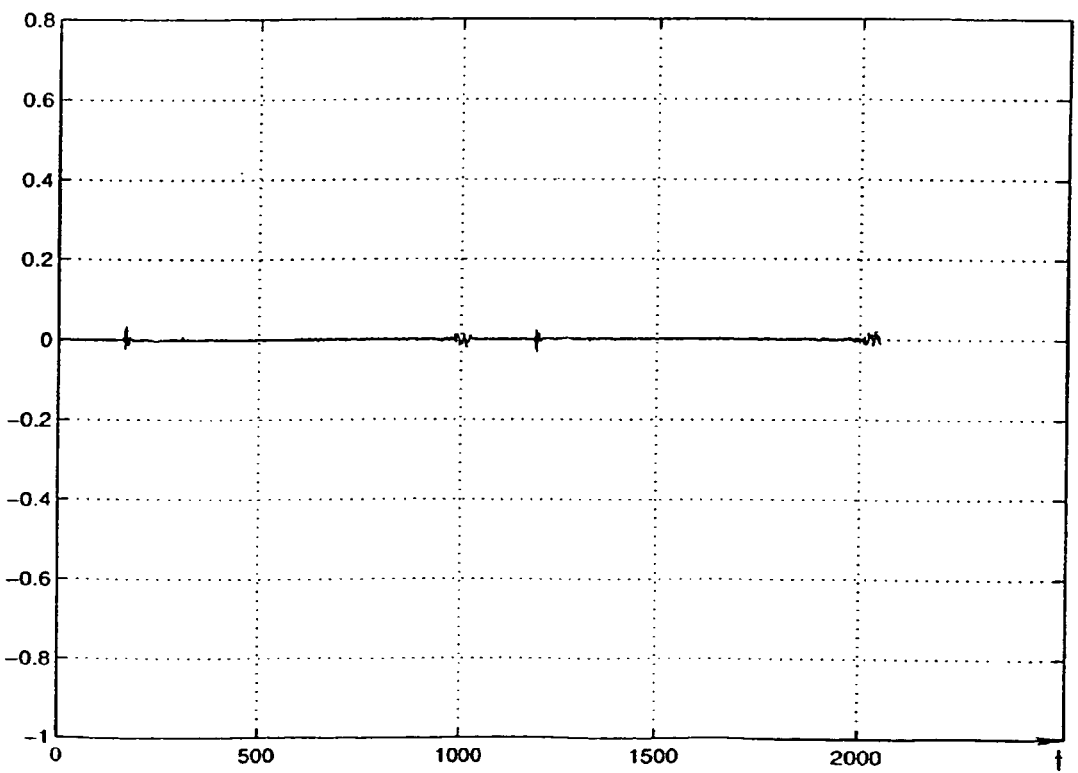
FIG. 16 shows the error in impulse response between the FIG. 14 filter extended by zeros in the time domain and the interpolated filter of FIG. 13.

The accompanying figures show:

in FIG. 13, the modulus of the transform function of the filter H for various points, together with various interpolated points for forming the vector H';

in FIG. 14, the impulse response of a filter H" obtained from that of H by the conventional method consisting in two fast Fourier transforms between which the impulse response of H is extended by 512 zeros;

in FIG. 15, the impulse response of the filter H' obtained at the output from the module M3 of the apparatus shown in FIG. 18; and in FIG. 16, the error between the impulse response of the filter H" and the impulse response of the filter H'.

The person skilled in the art will observe that the resulting error is here again compatible with the required performance, particularly in applications associated with transmitting speech, such as removing noise by means of optimum filtering.

In the apparatus of the invention, suitable filtering is used to replace the following complex sequence of operations: inverse transform, windowing or extension by means of zeros; and then forward transform. This low complexity filtering is applicable directly to the data coming from the transform, which transform is frequently the Fourier transform.

In a first variant, the apparatus makes it possible to approximate, with accuracy appropriate to the application, to time domain windowing in which M consecutive samples of a block of T samples (M<T) are set to zero. The filtering applied to the data in the transform domain can be considered as equivalent to lowpass filtering, i.e. to smoothing.

In a second variant, the apparatus makes it possible, to within a degree of accuracy that is appropriate to the application, to approximate extending a block of N samples with M zeros. The filtering applied to the data in the transform domain can then be considered as interpolation suitable for constructing the M missing points so as to extend the frequency data to N+M points.

Figure 19:
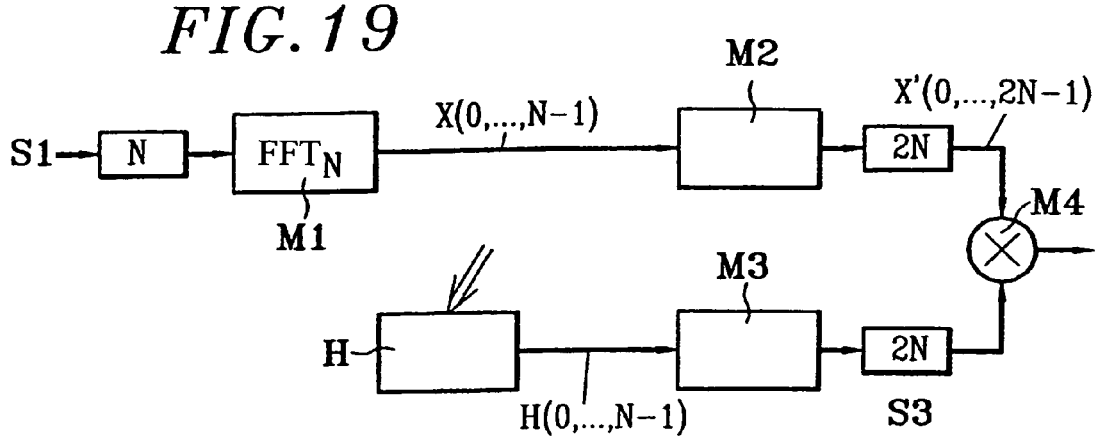
Figure 21:
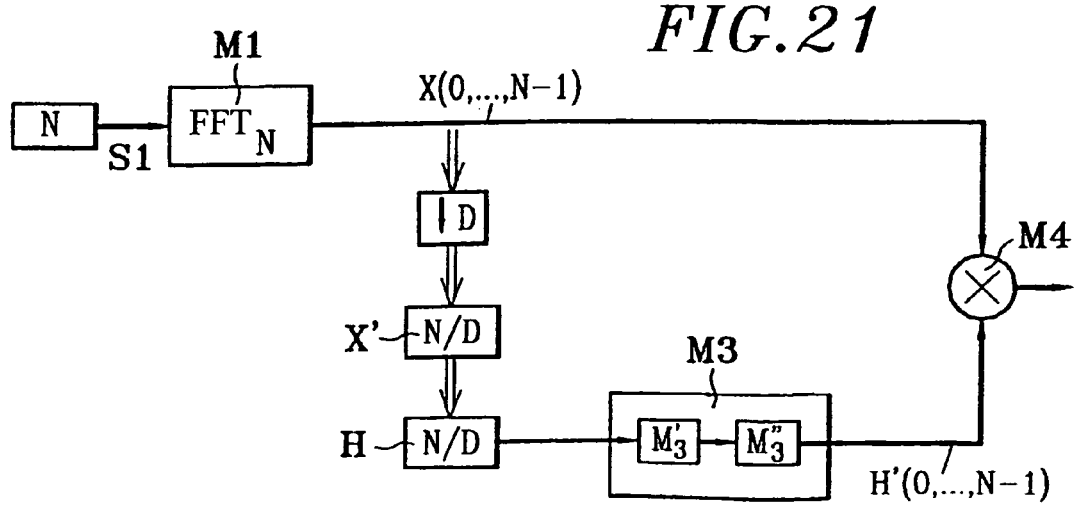

FIGS. 19, 20, and 21 show other examples of apparatus in accordance with the invention.

Each apparatus shown in FIGS. 19, 20, and 21 has a variable coefficient adaptive filter H with N or 2N coefficients. Each apparatus has a module M1 whose input receives a time domain signal S1 and which performs a Fourier transform on said signal.

The input of the first module M1 of the apparatus shown in FIG. 19 receives a time domain block S1 having N samples. This module M1 applies an N-point discrete Fourier transform to said signal S1 and thus delivers the Fourier transform X of said block of N data samples.

In FIG. 20, the module M1 pads out the signal S1 with zeros so as to obtain a signal having 2N coefficients, after which it performs a 2N-coefficient discrete Fourier transform on said padded-out signal.

In both of the above apparatuses, the transfer function H of the filter is computed using the Fourier transform X output by the module M1 and is adapted as a function of said Fourier transform X. This dependency is represented by the vertical double-shafted arrow.

In FIG. 19, at the output from the module M1, the apparatus has a module M2 which performs the two above-described operations of adding a zero between each pair of values in the N-coefficient signal X, so as to obtain a signal X'(0, . . . ,2N−1), and then implements convolution between the signal X' and a filter U of the kind described above.

Thus, the module M2 performs interpolation so as to extend the size of the Fourier transform directly to 2N frequency points starting from the signal X that has only N points, where X' has an impulse response equivalent to the impulse response of X extended by zeros.

The apparatus of FIG. 19 also has a module M3 performing the same interpolation operation on the transfer function H of the N-point filter, i.e. it inserts a zero between each pair of values in H, and then performs convolution with a function U of the kind described above, corresponding to zeroing a second portion of the impulse response of the 2N-point filter that is obtained, by inserting zeros.

Thus, in FIG. 19, a frequency domain signal is obtained at the output from the module M2 that is representative of a time domain signal having 2N points of which the first N points belong to the input signal S1. A frequency domain signal S3 having 2N points is obtained at the output from the module M3, and its impulse response has 2N points presenting for the first N points the same values as the impulse response of the filter H, and for the last N points, values of zero.

These two frequency domain signals S2 and S3 each having 2N points are subsequently multiplied in a multiplier module M4 which can equally well be a module that implements correlation or convolution between S2 and S3.

The apparatus of FIG. 20 is similar in structure to that of FIG. 18, except that the adaptive filter H has 2N coefficients, and the module M3 sets the last N coefficients of the impulse response of the filter to zero from the frequency domain. Smoothing thus makes it possible to achieve the equivalent of the linear convolution constraint and to limit the length of the impulse response of the filter to N points.

The frequency response H' obtained in this way is multiplied by the vector X in an output multiplier module M4.

FIG. 21 shows apparatus having the same structure as that described with reference to FIG. 18, except that the module M1 supplies an N-sample frequency transform and the decimator applies decimation to the N-sample Fourier transform X of the N data item block while retaining only one point in every D points (where D is an integer greater than or equal to 2).

This provides a vector X' having N/D points, from which it is possible to adapt the transfer function of the filter H, said transfer function H having L=N/D points. As for the apparatus of FIG. 18, a transfer function H' having N points is reconstituted by interpolation in a module M3 of the same kind as described in detail above, serving to perform linear convolution between H' and X in a multiplier module M5.

Within M3, a first module $M_3'$ introduces some number D of zeros after each sample of H. The frequency domain signal $H_0$ obtained in this way corresponds to an impulse response having D.L points in which the first L points are the same as those of the impulse response of H. The impulse response of H remains unchanged by introducing zeros between the initial samples.

A second submodule $M_3''$ then processes the resulting D.L point frequency domain signal $H_0$ so as to set the (D−1).L last points of the D.L point impulse response of $H_0$ to zero without altering the L first points of said impulse response. This provides the desired frequency domain vector H' having N=D.L points.

Such decimation has the advantage of significantly reducing the amount of computation required for adapting the filter H; it is applicable when the transfer function of the filter is fairly regular so that it can be decimated without critical loss of information.

By means of the invention, it will be observed that it is possible to use filters having a very small number of coefficients.

There follows a description of apparatus for cancelling acoustic echo, and apparatus for reducing some disturbance (noise or echo) by implementing apparatus of the invention.

As is well known in certain applications for transmitting speech, such as hands-free telephony or remote conferencing, appropriate apparatus needs to be used to counter acoustic echo which would otherwise constitute a significant source of difficultly in conversation.

Figure 22:
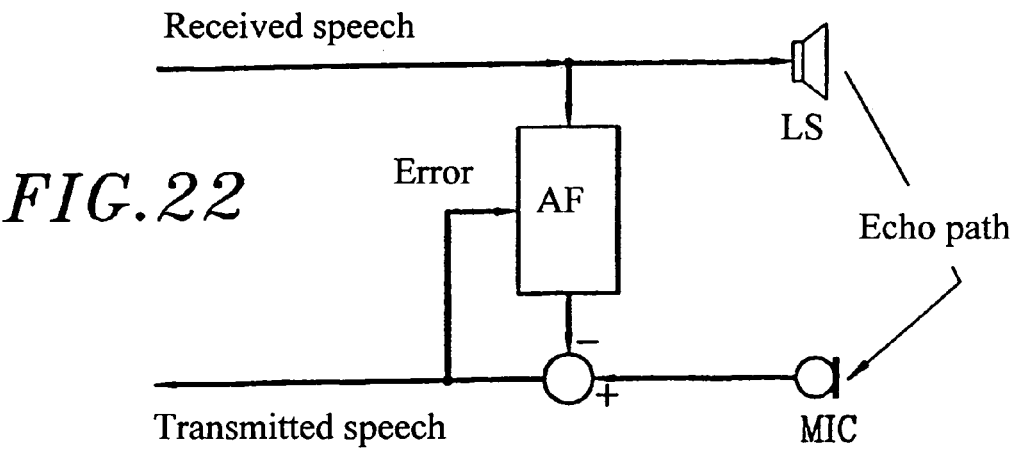
FIG. 22 is a diagram of a conventional type of echo canceller.

In the state of the art, such apparatus, as shown in FIG. 22, implements an adaptive filter AF whose function is to identify and model the impulse response of the acoustic coupling path between a loudspeaker LS and a microphone MIC of the hands-free telephone terminal or the remote conferencing system.

This portion of the apparatus is shown in FIG. 22 and is referred to as an acoustic echo canceller.

Practical embodiments of such apparatus can have a wide variety of implementations, for example those described in document [8].

The coefficients of the adaptive filter AF are adapted over time by some suitable algorithm making use of a received speech signal and an estimate of the error presented on the speech signal that is transmitted from the microphone MIC and after application of the filter AF to said signal. A conventional algorithm for adapting the coefficients of the filter AF is known under the name stochastic gradient or LMS.

In this case computation is performed in blocks, using the Fourier transform or the Hartley transform since this form requires a volume of computation that is much smaller than that required for the conventional time domain form.

Figure 23:
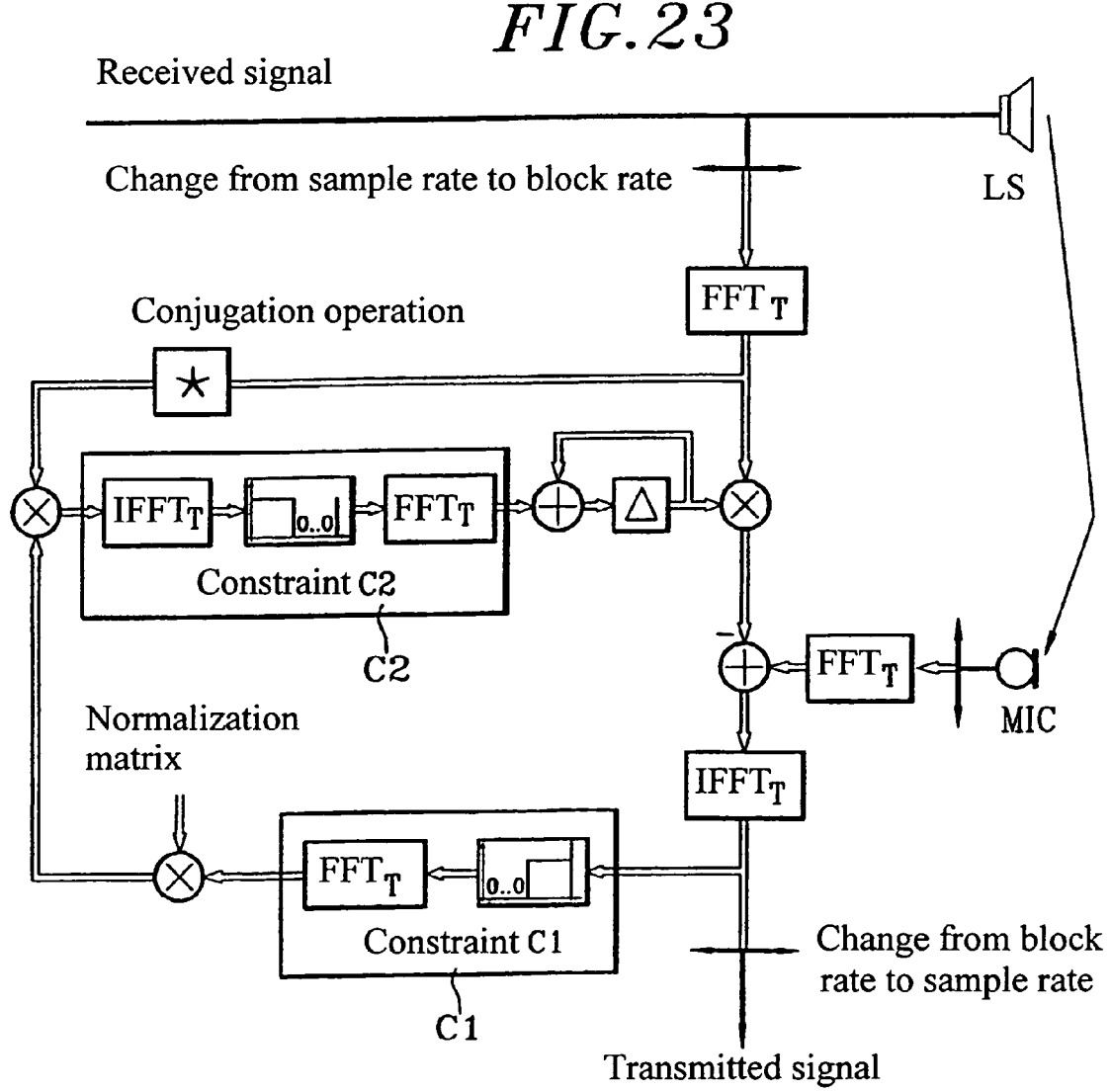
FIG. 23 shows a known echo canceller in functional detail.

FIG. 23 is a block diagram showing a typical implementation of an echo canceller. This apparatus has modules C1 and C2 respectively for applying a correlation calculation constraint and a linear convolution constraint. It will be observed that these modules C1 and C2 apply these constraints directly on a time domain signal and each of them is thus located between an inverse transform module and a forward transform module.

Figure 24:
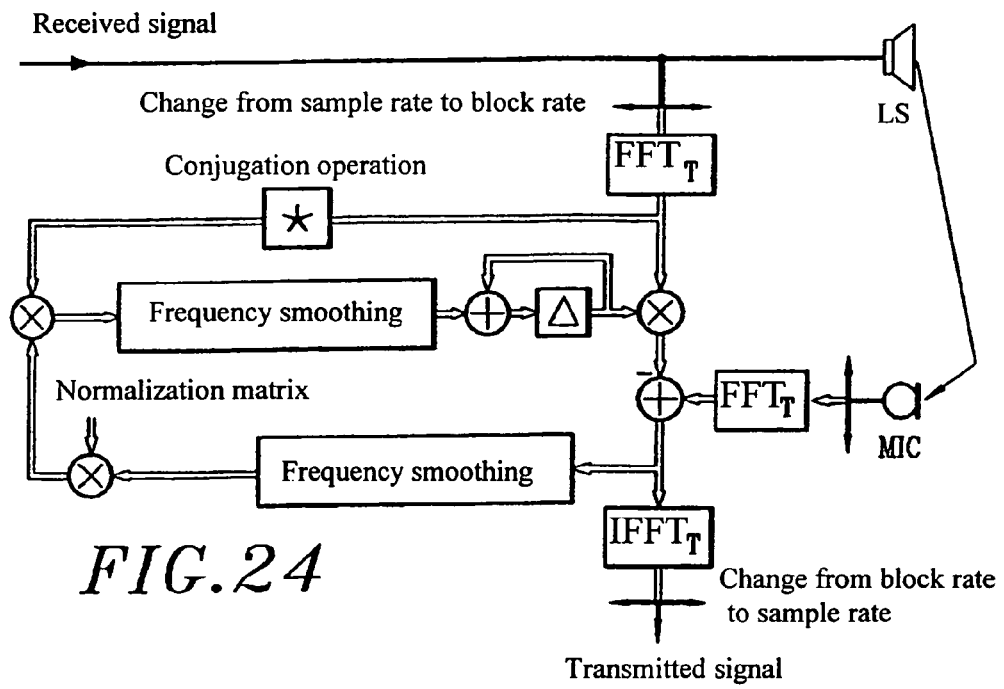
FIG. 24 shows an echo canceller of the invention in functional detail.

FIG. 24 is a block diagram of an echo canceller implemented in accordance with the invention.

In this apparatus, the modules C1 and C2 and the inverse and forward transform modules on either side of them has been replaced on each occasion by a smoothing module that does not involve computing a transform whether forward or reverse.

The following table summarizes the volume of computation that needs to be performed to process a real sample block for a conventional constraint module having transforms of size T and for a frequency smoothing filter having seven coefficients and using the computation reductions proposed above:

|  | Conventional form | Type of operation | Form modified by the invention |
|---|---|---|---|
| C1 | $2T\log_2 T$ | (×) | 3T |
|  | $2T\log_2 T$ | (+) | 4T |
| C2 | $4T\log_2 T + T$ | (×) | 3T |
|  | $4T\log_2 T$ | (+) | 4T |

Thus, considering a transform of size T=1024, this becomes:

|  | Conventional form | Type of operation | Form modified by the invention |
|---|---|---|---|
| C1 | 20 × 1024 | (×) | 3 × 1024 |
|  | 20 × 1024 | (+) | 4 × 1024 |

-continued

|    | Conventional form      | Type of operation | Form modified by the invention |
|----|------------------------|-------------------|--------------------------------|
| C2 | 41 × 1024<br>40 × 1024 | (×)<br>(+)        | 3 × 1024<br>4 × 1024           |

Using apparatus of the invention thus provides a saving of 109,568 arithmetical operations, all types of operation combined (the total number of operations being reduced to 14,336).

It is also well known that in speech transmission applications, the background noise picked up by the microphone of the terminal can give rise to difficulty for remote users (noise level can be very high during a telephone conversation taking place from a hands-free radiotelephone terminal installed in a vehicle).

Similarly, for a transmission system installed in a room, it is well known that in the absence of echo cancelling apparatus based on the principle of FIG. 22, or even in the presence of echo cancelling apparatus but having an adaptive filter of length that is significantly shorter than the acoustic response of the room, the echo present on the transmitted speech channel can give rise to serious difficulties for such remote users.

In the conventional state of the art, techniques based on using a variable attenuator ("variable gain" techniques) are employed to reduce the difficulty due to echo. In more advanced state of the art equipment, variable filters adapted on the basis of the characteristics of the various signals ("optimum" filters) are used for this purpose and provide better subjective quality. Such variable filters can be effective in reducing the noise present on the speech as transmitted.

Figure 25:
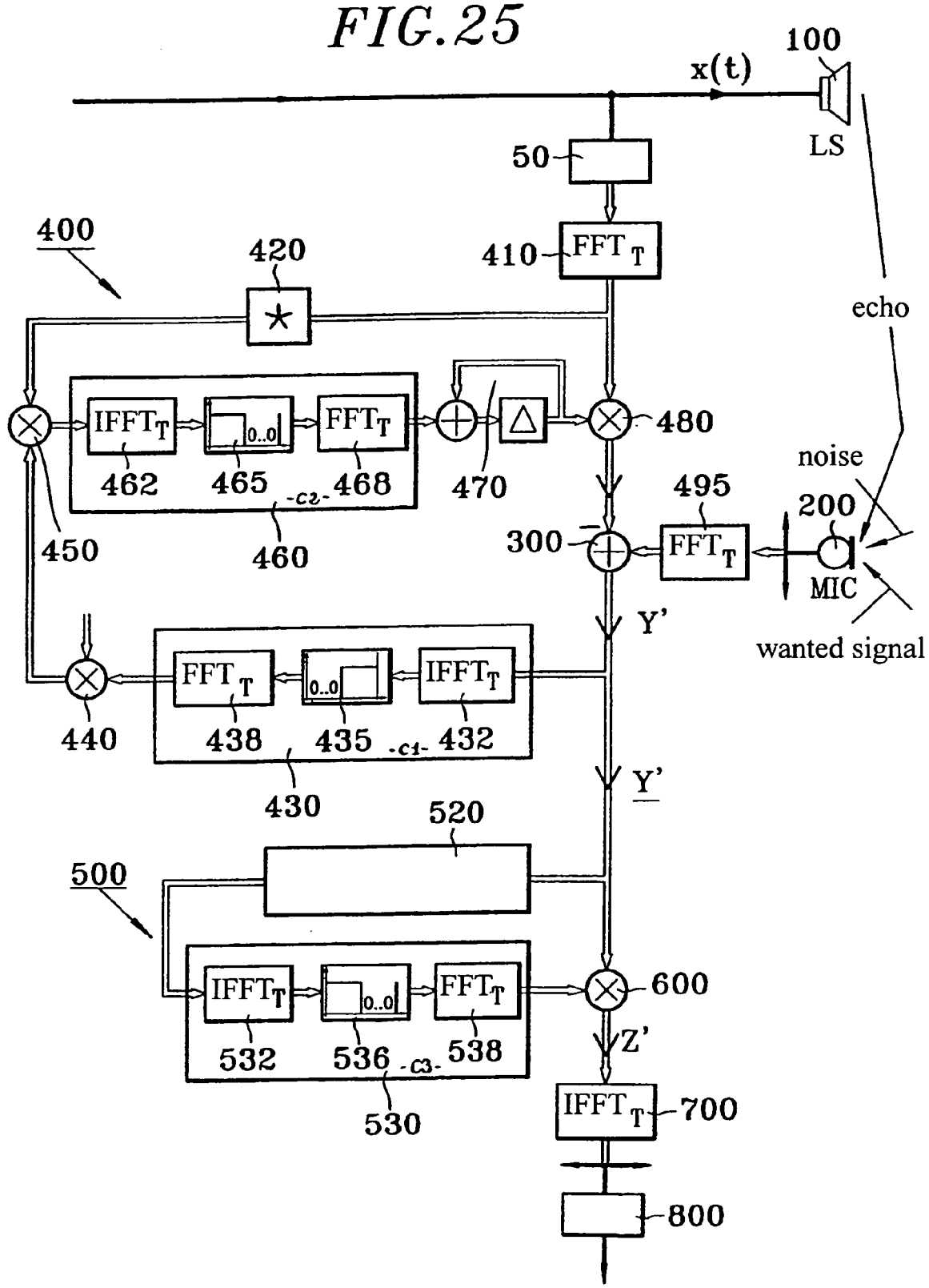
FIG. 25 shows apparatus for cancelling echo and noise.

FIG. 25 shows apparatus based both on using an echo canceller and on using an optimum filter to reduce disturbance made up of noise and/or echo.

The echo canceller module of this apparatus of the invention comprises a loudspeaker 100, a microphone 200, a subtracter 300, and a filter unit 400.

This filter unit 400 has a first input receiving a signal x(t) that also reaches the loudspeaker 100, the filter unit also has a second input that receives a signal which is obtained at the output from the subtracter module 300, by subtracting from a microphone signal y(t) transformed into the frequency domain a signal that is obtained by applying the filter module to the loudspeaker signal x(t).

The echo canceller module has two branches which meet at a multiplier 450. A first one of these branches has a module 410 for applying a forward Fourier transform to the loudspeaker signal x(t), and a module 420 for conjugating the transformed signal. The second branch has a constraint module C1 applying a constraint on a signal Y' to calculate an error vector, and a multiplier module 440 at the output from the constraint module C1 to be multiplied by a normalization matrix. The multiplier module 450 multiplies the loudspeaker vector as transformed and conjugated, by the error vector as multiplied by the normalization matrix.

The multiplication module 450 delivers a frequency domain vector to a constraint module C2. At the output from the constraint module C2, there is placed a module 470 for updating the coefficients of an adaptive filter of the echo canceller. The filter updated in this way is applied to the transform of the loudspeaker signal x(t) in a multiplier module 480 located at the output from the update apparatus 470 and upstream from the subtracter 300.

The apparatus of the invention presents a fundamental advantage over conventional apparatuses whereby the frequency domain signal to which the filter is applied in the module 480 is no longer transformed immediately into the time domain to be subtracted from the time domain signal y(t) as input by the microphone, but is kept in the frequency domain. Thus, in this apparatus, it is the microphone signal y(t) which is transformed into the frequency domain to enable the estimated echo signal as obtained from the output of the multiplier 480 and as retained in the frequency domain to be subtracted from this microphone signal as transformed into the frequency domain. This subtraction operation in the frequency domain takes place in the subtracter 300 which is disposed between the module 480 for applying the adaptive echo cancelling filter and a forward Fourier transform module 495 at the output from the microphone.

Within this apparatus, it is not a time domain error signal corresponding to the microphone signal from which the estimated echo signal has been subtracted that is transmitted to the constraint module C1. The constraint module C1 receives an frequency error vector without any return to the time domain between calculating this error vector and the constraint module C1. This frequency error vector is equal to the difference between the frequency transform of the loudspeaker signal to which the adaptive filter 470 is applied and the microphone signal as transformed into the frequency domain. Thus, the constraint module C1, unlike conventional apparatuses, does not present two submodules, but three submodules constituted successively by a first submodule 432 performing the inverse Fourier transform into the time domain, a second submodule 435 for zeroing an initial portion of the time domain signal obtained at the output from the module 432, and a third submodule 438 receiving the truncated time domain signal and applying a forward Fourier transform into the frequency domain.

Thus, the constraint module C1 performs processing on the frequency error vector it receives that is equivalent to truncating the time domain transform of this frequency error signal.

The frequency error signal Y' is thus used by the unit made up of the C1 constraint module 430, the C2 constraint module 460, the multiplier module 450, and the conjugating module 420 to calculate a new set of coefficients for the adaptive filter with a new block of samples x((t+1)B), which new set of coefficients is applied to the new loudspeaker data block x((t+1)B) so as to deliver a new vector Y'.

The signal Y' obtained at the output from the subtracter 300 is delivered not only to the constraint module C1, but also to the second portion of the apparatus that serves to reduce disturbances.

This is itself conventional in structure. The signal Y' obtained at the output from the echo canceller is supplied to the input of a loop 500 passing successively through two modules 520 and 530. The module 520 calculates coefficients for the disturbance-reducing filter on the basis of the frequency domain signal Y'. The frequency domain vector output from this first module 520 is applied to a module 530 which applies a constraint C3 on the frequency domain vector. The module 530 comprises three submodules, a first submodule 532 performing an inverse Fourier transform on the frequency domain vector output by the module 520 so as to obtain the time domain signal that corresponds to said vector. This time domain signal is then subjected to a submodule 536 which zeros a portion of this vector, and more precisely zeros a final portion thereof, after which the truncated time domain vector is subjected to a forward Fourier transform in a third submodule 538. The loop 500 thus supplies a disturbance-reducing filter whose frequency coefficients are such that their inverse Fourier transform has a reduced number of non-zero coefficients.

The frequency domain vector obtained at the output from the second module 530 is applied to the frequency error signal Y' in a multiplier module 600. This provides a frequency domain signal Z' corresponding to the Fourier transform of a time domain signal whose echo has been cancelled and whose disturbances, in this case noise, have been reduced.

The resulting frequency domain vector Z' is then transformed into the time domain by an output module 700 that applies an inverse Fourier transform to the signal Z'. A block of time samples is then obtained from which the echo has been cancelled and in which disturbances have been reduced.

It will also be observed that there is a module 800 disposed at the output from said apparatus so as to convert from a block rate to a sample rate. The resulting sound message is then transmitted to a remote party who therefore receives the sound signal present at the microphone 200 at a given instant from which the echo and noise have been eliminated.

This apparatus thus makes it possible to eliminate a forward Fourier transform module that would conventionally be required between an error computing module and a module for reducing disturbances when two such modules are coupled together. The frequency domain signal Y' is thus delivered directly to the loop 500 and in particular to the first module of said loop that performs disturbance-reducing filter computation.

Thus, the output from the constraint module 530 provides a set of disturbance-reducing filter coefficients adapted as a function of the signal Y'.

The apparatus described above has a noise reducer. Nevertheless, the noise reducer can be replaced by an echo reducing module, a reducer that diminishes a mixture of echo and noise, or more generally any disturbance reducer.

It may be observed that three constraint modules C1, C2, and C3 are present, each of which is constituted by a module for zeroing a portion of a time domain signal lying between two transform modules, one inverse and the other forward. The constraint C3 can be thought of as a linear convolution constraint. In the invention, C3 can be considered as being means for smoothing the frequency response of the filter and for controlling the selectivity of the filter by limiting its time domain medium and thus zeroing as many samples as necessary for subsequently performing a transform of size T.

In the invention, each of the three constraint modules C1, C2, and C3 is replaced by a frequency smoothing module. Depending on the desired objective, the constraint C3 can be replaced by a frequency smoothing module or by an interpolation module of the invention. The volume of computation performed in the apparatus of the invention is considerably smaller than that in the conventional apparatus.

Thus, in FIG. 25, making an echo canceller combined with optimized disturbance reduction by filtering requires nine transforms to be used. The apparatus of FIG. 26 differs from that described above with reference to FIG. 25 only in that the three constraint modules C1, C2, and C3 are replaced by smoothing modules implementing convolution with a function U of the kind described previously.

Figure 26:
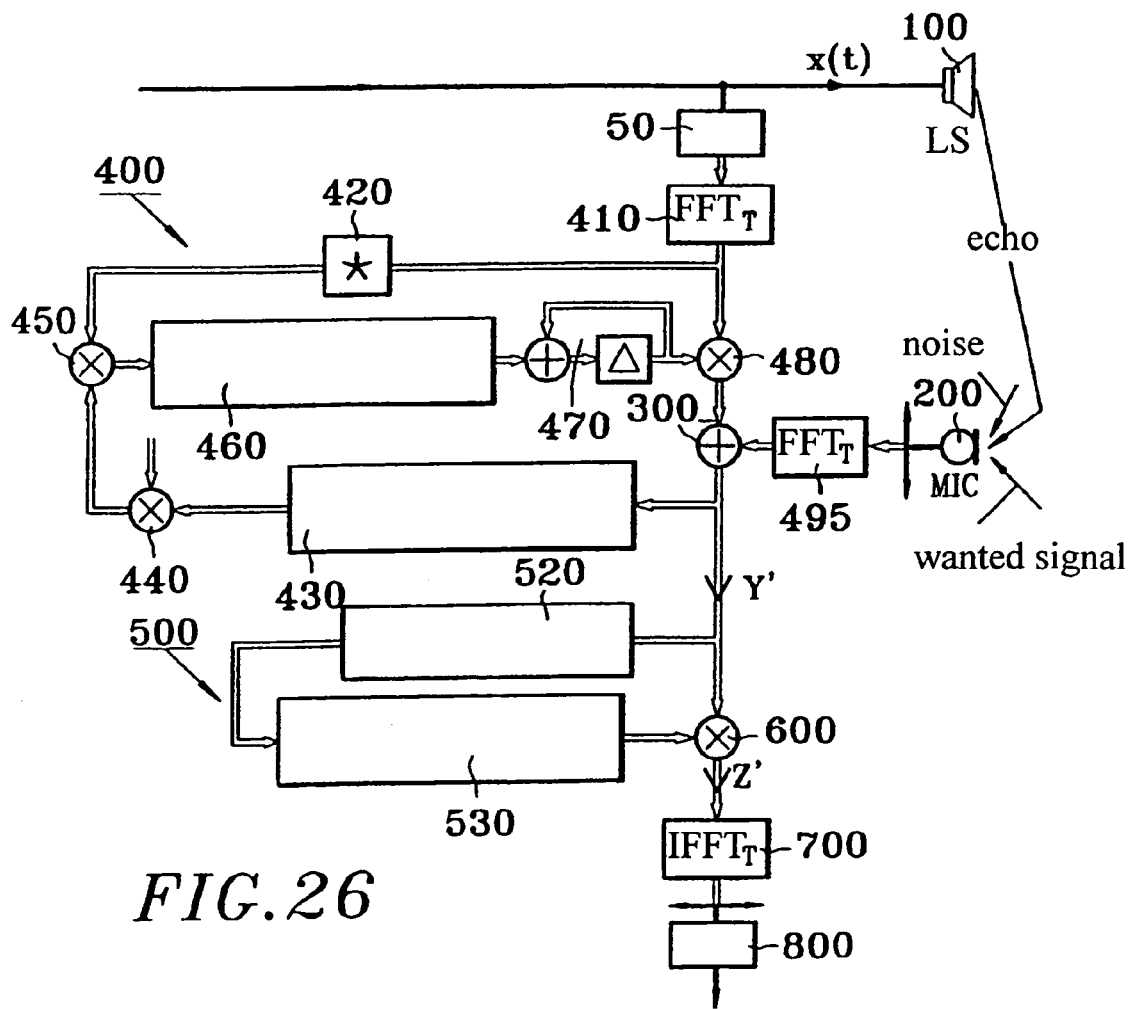
FIG. 26 shows apparatus that performs the same function as that of FIG. 25, and implemented in accordance with the invention.

As shown in FIG. 26, a corresponding system of the invention requires only three transforms and three smoothing modules, each of the three smoothing modules replacing a set of two transforms and one time domain constraint.

The following table gives the volume of computation that needs to be performed to implement the constraints C1, C2, and C2 for a transform of size T (FIG. 25), and for a frequency smoothing filter having seven coefficients (FIG. 26):

|    | Conventional form | Type of operation | Form modified by the invention |
|----|-------------------|-------------------|-------------------------------|
| C1 | $4T\log_2 T + T$  | (×)               | 4T                            |
|    | $4T\log_2 T$      | (+)               | 7T                            |
| C2 | $4T\log_2 T + T$  | (×)               | 4T                            |
|    | $4T\log_2 T$      | (+)               | 7T                            |
| C3 | $4T\log 2T + T$   | (×)               | 4T                            |
|    | $4T\log 2T$       | (+)               | 7T                            |

Thus, for a transform of size T=1024, this amounts to:

|    | Conventional form | Type of operation | Form modified by the invention |
|----|-------------------|-------------------|-------------------------------|
| C1 | 41 × 1024         | (×)               | 4 × 1024                      |
|    | 40 × 1024         | (+)               | 7 × 1024                      |
| C2 | 41 × 1024         | (×)               | 4 × 1024                      |
|    | 40 × 1024         | (+)               | 7 × 1024                      |
| C3 | 41 × 1024         | (×)               | 4 × 1024                      |
|    | 40 × 1024         | (+)               | 7 × 1024                      |

Using apparatus of the invention thus provides a saving of 215,040 arithmetical operations, all operations combined. (With the total number of operations being reduced to 33,792.)

It makes it possible to act directly in the transform domain, i.e. in the frequency domain, the equivalent of zeroing a given number of time domain coefficients (smoothing) or the equivalent of adding a given number of zeros in the time domain (interpolation), which condition is necessary to avoid generating circular convolution/correlation when filtering/correlation is performed in the transform domain, as is explained in detail in document [6].

Thus, apparatus as shown in FIG. 25 is particularly well adapted to obtaining a significant reduction in computation by using a function U of the kind described above. Such apparatus provided with such smoothing modules makes it possible to implement echo cancellation and disturbance reduction completely in the frequency domain, without returning into the time domain which is expensive in computation.

The various apparatuses described can be implemented using state of the art means, in particular real time digital signal processors (DSPs) typically using floating point arithmetic, e.g. those commonly used in audio and telecommunications applications (e.g. TMS320QC3X or TMS320C4X from Texas Instruments); fixed point arithmetic processors can also be used providing the usual precautions are taken to frame the data appropriately during processing. It should be observed that the invention not only presents advantages in terms of complexity, but also makes implementation easier (there is no "scrambling" type permutation, there are fewer framing problems when performing fixed point computation, programming is simpler, addressing is simpler, . . . ).

Apparatus of the invention is thus most advantageous whenever time variable filtering is performed and work is done in the transform domain.

This covers not only the adaptive filtering used in echo cancelling, but also, more generally, any adaptive filtering in multiple uses: removing noise, separating signals, etc.

A typical context for applying apparatus of the invention is described in [7], where conventional apparatus having two transforms on either side of a windowing module is used for giving selective characteristics to a filter by modifying the size of its impulse response.

In certain embodiments described herein, U is convoluted with a function X which is the discrete Fourier transform of a discrete time domain signal. Naturally, a function U of the kind described above applies in the same manner to frequency domain signals corresponding to a discrete Fourier transform of a continuous time domain signal.

[1] G. A. CLARK, R. PARKER, S. K. MITRA, "A Unified Approach to Time-and-Frequency-Domain Realization of FIR Adaptive Digital Filters", IEEE Trransactions on Acoustics, Speech and Signal Processing, Vol. ASSP-31, No. 5, October 1983.

[2] D. MANSOUR, A. H. GRAY, Jr., "Unconstrained Frequency-Domain Adaptive Filter", IEEE Transactions on Acoustics, Speech and Signal Processing, Vol. ASSP-30, No. 5, October 1982, pp. 726–734.

[3] J. PRADO, E. MOULINES, "Frequency-domain-adaptive filtering with applications to acoustic echo cancellation", Annales des Télécommunications, Vol. 49 No. 7–8, July-August 1994, pp. 414–428.

[4] H. McLAUGHLIN, Signalworks, USA, "System and method for an efficiently constrained frequency-domain adaptive filter", ref. U.S. Pat. No. 5,526,426, filed Nov. 8, 1994, issued Jun. 11, 1996.

[5] P. SOMMEN, T. A. CLAASEN, P. VAN GERWEN, H. KOTMANS, Philips Corporation, "Frequency-domain block-adaptive digital filter", ref. U.S. Pat. No. 4,807,173, filed Jun. 3, 1987, issued Feb. 21, 1989.

[6] A. V. OPPENHEIM, R. W. SCHAFER, "Digital Signal Processing", Prentice-Hall, 1975.

[7] V. TURBIN, A. GILLOIRE, P. SCALART, "Comparison of three post-filtering algorithms for residual acoustic echo reduction", ICASSP'97, Munich, Vol. 1, pp. 307–310.

[8] E. HÄNSLER, "The hands-free telephone problem: an annotated bibliography update", Annales des Télécommunications, 49, No. 7–8, 1994, pp. 360–367.

We claim:

1. A method for zeroing a portion of a time domain impulse response of a speech filter for zeroing a portion of a time domain impulse response of a filter in a speech transmission apparatus which filter has a frequency domain transfer function Z(k), said method comprising:
  implementing convolution with a function U on the frequency domain transfer function Z(k) where k lies in the range 0 to N−1, wherein the function U has the form:

$$U(k) = \mathrm{sinc}\left(\frac{k - k_0}{2}\right) \cdot e^{-j\pi\left(\frac{a(k-k_0)}{2}\right)} \cdot P(k)$$

where $\alpha$ is a parameter, $k_0$ is a constant integer and $P(k)$ is a weighting window that is symmetrical about $k=k_0$.

2. The method according to claim 1, wherein $k_0$ is equal to zero.

3. The method according to claim 1, further comprising receiving a frequency domain vector (H).

4. The method according to claim 3, further including computing the coefficients of the filter (H) on the basis of an input signal (X, S1).

5. The method according to claim 1, further comprising applying convolution with a first function having the form:

$$U(k) = \mathrm{sinc}\left(\frac{k - k_0}{2}\right) \cdot e^{-j\pi\left(\frac{a(k-k_0)}{2}\right)} \cdot P(k)$$

on a frequency transform (X) of an input signal that is optionally augmented, and applying a second convolution with a second function having the form:

$$U(k) = \mathrm{sinc}\left(\frac{k - k_0}{2}\right) \cdot e^{-j\pi\left(\frac{a(k-k_0)}{2}\right)} \cdot P(k)$$

on the frequency response (H) of a filter (H) that is optionally augmented.

6. The method according to claim 1, wherein the convolution with U outputs a vector B(0, . . . ,N−1) which is such that for all k, a coefficient in B of index k is equal to a product of convolution between Z and U which is such that the coefficient of index $k_0$ in Z is multiplied in said convolution product with the coefficient of index $k_0$ of U for which the sinc function has an argument of 0.

7. The method according to claim 1, wherein the function U takes non-zero values over a range of values of k which is symmetrical about the value $k_0$.

8. The method according to claim 1, wherein the function U has an odd number of coefficients Lu, and in that U can be written:

$$U(k) = \mathrm{sinc}\left(-\frac{Lu-1}{4} + \frac{k}{2}\right) \cdot e^{-ja\pi\left(-\frac{Lu-1}{4} + \frac{k}{2}\right)} \cdot P(k)$$

9. The method according to claim 1 further comprising applying convolution with a first function having the form:

$$U(k) = \mathrm{sinc}\left(\frac{k - k_0}{2}\right) \cdot e^{-j\pi\left(\frac{a(k-k_0)}{2}\right)} \cdot P(k)$$

on a frequency transform (X) of an input signal that is optionally augmented, and applying a second convolution with a second function having the form:

$$U(k) = \mathrm{sinc}\left(\frac{k - k_0}{2}\right) \cdot e^{-j\pi\left(\frac{a(k-k_0)}{2}\right)} \cdot P(k)$$

on the frequency response (H) of a filter (H) that is optionally augmented, wherein the transform is a discrete Fourier transform.

10. The method according to claim 1, wherein the weighting window is a Kaiser window having a coefficient of 1.5.

11. The method according to claim 1, wherein it constitutes an echo cancelling method.

12. The method according to claim 1, wherein the method constitutes a noise reducing method.

13. The method according to claim 1, wherein α=1.

14. The method according to claim 1, wherein the filter is an adaptive filter of an echo canceller in an apparatus comprising a microphone and a loudspeaker.

15. The method according to claim 1, wherein α=−1.

16. An apparatus comprising:

a loudspeaker (100), a microphone (200), an echo canceller (420, 430, 440, 450), and a disturbance reducer (500), the echo canceller including an adaptive filter (470) and a subtracter module (300) delivering the error (Y') between a signal coming from the microphone (200) and a signal obtained by applying the adaptive filter to a loudspeaker signal (100), the adaptive filter (460) adapting its coefficients as a function of said error, and the apparatus including means (495) suitable for transforming the signal from the microphone into the frequency domain upstream from the subtracter module (300) in such a manner that the subtraction is performed in the frequency domain, wherein the apparatus includes means for implementing a method onto the adaptive filter, said method for zeroing a portion of a time domain impulse response of a filter in a speech for zeroing a portion of a time domain impulse response of a filter in a speech transmission apparatus which filter has a frequency domain transfer function Z(k), said method comprising:

implementing convolution with a function U on the frequency domain transfer function Z(k) where k lies in the range 0 to N−1, wherein the function U has the form:

$$U(k) = \mathrm{sinc}\left(\frac{k-k_0}{2}\right) \cdot e^{-j\pi\left(\frac{a(k-k_0)}{2}\right)} \cdot P(k)$$

where α is a parameter, $k_0$ is a constant integer and P(k) is a weighting window that is symmetrical about $k=k_0$.

17. The apparatus according to claim 16, further including means (430, 440) for transmitting the result of said frequency domain subtraction to the adaptive filter (470) of the echo canceller.

18. The apparatus according to claim 16, wherein the disturbance reducer (500) is placed downstream from the subtracter module (300) and is applied in the frequency domain to the result of the subtraction.

19. The apparatus according to claim 18, wherein the disturbance reducer (500) includes an adaptive filter (520) suitable for recalculating coefficients of said disturbance reducer as a function of a frequency domain input signal (Y') from the disturbance reducer (500).

20. The apparatus according to claim 19, wherein the disturbance reducer (500) is placed to receive the frequency domain signal (Y') output from the subtracter module (300) as said frequency domain input signal of the disturbance reducer.

21. The apparatus according to claim 19, wherein the disturbance reducer (500) forms a loop receiving as input the frequency domain signal (Y) output from the subtracter (300), and applying at its output multiplication by the adapted coefficients of its adaptive filter on the frequency domain signal (Y') output by the subtracter (300).

22. The apparatus according to claim 19, wherein the same frequency domain signal (Y') is used as an error signal for adapting the adaptive filter (470) of the echo canceller and is multiplied by the coefficients of the adaptive filter (520) of the disturbance reducer (500).

23. The apparatus according to claim 16, wherein no transform module is placed between the subtracter module (300) and the disturbance reducer (500).

24. A method for zeroing a time domain speech transmission signal which signal has a frequency domain transform Z(k), said method comprising implementing convolution with a function U on the frequency domain transform Z(k) where k lies in the range 0 to N−1, wherein the function U has the form:

$$U(k) = \mathrm{sinc}\left(\frac{k-k_0}{2}\right) \cdot e^{-j\pi\left(\frac{a(k-k_0)}{2}\right)} \cdot P(k)$$

where α is a parameter, $K_0$ is a constant integer and P(k) is a weighting window that is symmetrical about $k=ko\ K_0$.

25. The method according to claim 24, further including a transform into the frequency domain of an input time domain signal (S1), upstream from performing convolution with U.

* * * * *